(12) United States Patent
Hoshino et al.

(10) Patent No.: US 12,462,969 B2
(45) Date of Patent: Nov. 4, 2025

(54) COIL COMPONENT

(71) Applicant: TAIYO YUDEN CO., LTD., Tokyo (JP)

(72) Inventors: Hideaki Hoshino, Tokyo (JP); Kenji Okabe, Tokyo (JP); Kozue Imaizumi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 803 days.

(21) Appl. No.: 17/330,014

(22) Filed: May 25, 2021

(65) Prior Publication Data

US 2021/0375528 A1 Dec. 2, 2021

(30) Foreign Application Priority Data

May 28, 2020 (JP) .................. 2020-093778

(51) Int. Cl.
*H01F 5/00* (2006.01)
*H01F 27/06* (2006.01)
*H01F 27/28* (2006.01)
*H01F 27/29* (2006.01)
*H01F 41/04* (2006.01)

(52) U.S. Cl.
CPC ............. *H01F 27/29* (2013.01); *H01F 27/06* (2013.01); *H01F 27/2804* (2013.01); *H01F 41/041* (2013.01); *H01F 2027/2809* (2013.01)

(58) Field of Classification Search
CPC ..................................................... H01F 27/29
USPC ............................................................ 336/200
See application file for complete search history.

(56) References Cited

U.S. PATENT DOCUMENTS

| 5,610,565 A * | 3/1997 | Maeda .................. H03H 1/0007 333/185 |
| 6,114,936 A * | 9/2000 | Yamamoto ............ H01F 27/292 336/200 |
| 2006/0215350 A1* | 9/2006 | Tonogai .................... H01G 4/30 361/311 |
| 2011/0074537 A1* | 3/2011 | Nakatsuji ............ H01F 17/0013 336/200 |
| 2012/0019978 A1 | 1/2012 | Yoshida |

(Continued)

FOREIGN PATENT DOCUMENTS

| JP | 2006-278556 A | 10/2006 |
| JP | 2012-044148 A | 3/2012 |

(Continued)

OTHER PUBLICATIONS

Notice of Reasons for Refusal dated Nov. 21, 2023, issued in corresponding Japanese Patent Application No. 2020-093778, with English translation (12 pgs.).

(Continued)

*Primary Examiner* — Ronald Hinson
(74) *Attorney, Agent, or Firm* — Pillsbury Winthrop Shaw Pittman, LLP

(57) ABSTRACT

A coil component according to one or more embodiments of the present invention includes: an insulating base body having a bottom surface; a coil conductor disposed in the base body and having a coil surface opposed to the bottom surface; and a reinforcement portion disposed in the base body. The reinforcement portion is disposed at a position closer to the bottom surface than is a middle point between the bottom surface and the coil surface.

19 Claims, 23 Drawing Sheets

(56) References Cited

U.S. PATENT DOCUMENTS

| | | | |
|---|---|---|---|
| 2015/0116966 A1* | 4/2015 | Lee | H01G 4/30 |
| | | | 361/767 |
| 2015/0318110 A1* | 11/2015 | Lee | H01G 4/30 |
| | | | 361/301.4 |
| 2016/0172098 A1* | 6/2016 | Jeong | H01F 27/361 |
| | | | 336/90 |
| 2018/0096778 A1* | 4/2018 | Yatabe | H01G 4/30 |
| 2021/0065977 A1* | 3/2021 | Kim | H01G 4/012 |
| 2022/0028597 A1* | 1/2022 | Kobayashi | H01F 27/2804 |
| 2022/0059271 A1* | 2/2022 | Shigematsu | H01F 27/004 |

FOREIGN PATENT DOCUMENTS

| | | |
|---|---|---|
| JP | 2013-058539 A | 3/2013 |
| JP | 2015-115518 A | 6/2015 |
| JP | 2017-011172 A | 1/2017 |

OTHER PUBLICATIONS

Decision of Refusal dated Apr. 23, 2024, issued in corresponding Japanese Patent Application No. 2020-093778, with English translation (10 pgs.).

\* cited by examiner

COIL COMPONENT

CROSS-REFERENCE TO RELATED APPLICATIONS

This application is based on and claims the benefit of priority from Japanese Patent Application Serial No. 2020-093778 (filed on May 28, 2020), the contents of which are hereby incorporated by reference in their entirety.

The present invention relates to a coil component.

BACKGROUND

It is demanded to ensure the mechanical strength of electronic components such as a downsized coil component. For example, Japanese Patent Application Publication No. 2012-044148 ("the '148 Publication") discloses a ceramic electronic component including a reinforcement portion made of a metal material in a base body. In the '148 Publication, the reinforcement portion improves the mechanical strength of the ceramic electronic component.

In the conventional electronic component including the reinforcement portion, the effects of the reinforcement portion on the electrical characteristics and the magnetic characteristics of the electronic component are not considered. With the reinforcement portion made of a metal material disposed in the base body of the coil component, the magnetic flux generated by the electric current flowing through the coil conductor passes the reinforcement portion and causes an eddy current to occur in the reinforcement portion. This results in an eddy current loss.

SUMMARY

One object of the present invention is to solve or alleviate the above drawback of the conventional coil component. In particular, one object of the present invention is to inhibit occurrence of the eddy current in the coil component including the reinforcement portion. Other objects of the present invention will be made apparent through the entire description in the specification. The invention disclosed herein may solve any other drawbacks grasped from the entirety of the following description, instead of or in addition to the above drawback.

A coil component according to one or more embodiments of the present invention comprises: an insulating base body having a bottom surface; a coil conductor disposed in the base body and having a coil surface opposed to the bottom surface; and a reinforcement portion made of a metal material and disposed in the base body at a position closer to the bottom surface than is a middle point between the bottom surface and the coil surface. The coil component according to one or more embodiments of the present invention may comprise: a first external electrode electrically connected with one end of the coil conductor and having a first bottom portion contacting at least with the bottom surface of the base body; and a second external electrode electrically connected with the other end of the coil conductor and having a second bottom portion contacting at least with the bottom surface of the base body.

In one or more embodiments of the present invention, the first external electrode and the second external electrode are positioned such that a distal end of the first bottom portion is opposed to a distal end of the second bottom portion of the second external electrode. In one or more embodiments of the present invention, the reinforcement portion is positioned to overlap, in a top view, with at least a part of the distal end of the first bottom portion and at least a part of the distal end of the second bottom portion.

In one or more embodiments of the present invention, the distal end of the first bottom portion and the distal end of the second bottom portion extend in an axial direction, and the reinforcement portion overlaps, in the top view, with 50% or more of each of the distal end of the first bottom portion and the distal end of the second bottom portion in the axial direction.

In one or more embodiments of the present invention, the reinforcement portion is disposed in the base body so as not to be exposed out of the base body in the axial direction.

In one or more embodiments of the present invention, the reinforcement portion is connected with at least one of the first external electrode and the second external electrode.

In one or more embodiments of the present invention, the reinforcement portion is made of a nonmagnetic metal material.

In one or more embodiments of the present invention, the reinforcement portion includes a first reinforcement member and a second reinforcement member spaced apart from the first reinforcement member.

In one or more embodiments of the present invention, the first external electrode and the second external electrode are positioned such that a distal end of the first bottom portion is opposed to a distal end of the second bottom portion of the second external electrode. In one or more embodiments of the present invention, the first reinforcement member overlaps with at least a part of the distal end of the first bottom portion, and the second reinforcement member overlaps with at least a part of the distal end of the second bottom portion.

In one or more embodiments of the present invention, the second reinforcement member is positioned closer to the bottom surface than is the first reinforcement member.

In one or more embodiments of the present invention, the first reinforcement member is connected with the first external electrode.

In one or more embodiments of the present invention, the second reinforcement member is connected with the second external electrode.

In one or more embodiments of the present invention, the base body includes a first region and a second region, the first region covers the coil conductor, and the second region is disposed between the reinforcement portion and the bottom surface and has a higher Vickers hardness than the first region.

In one or more embodiments of the present invention, the first bottom portion of the first external electrode and the second bottom portion of the second external electrode are in contact with the second region.

In one or more embodiments of the present invention, the reinforcement portion is in contact with a top surface of the second region.

In one or more embodiments of the present invention, the base body includes a third region and a fourth region, the third region covers the coil conductor, and the fourth region is disposed at least between the reinforcement portion and the first external electrode or between the reinforcement portion and the second external electrode and has a higher permittivity than the third region.

In one or more embodiments of the present invention, the fourth region is additionally disposed between the reinforcement portion and the coil conductor.

In one or more embodiments of the present invention, the coil conductor includes a winding portion wound around a coil axis extending in a direction perpendicular to the bottom surface of the base body.

In one or more embodiments of the present invention, the coil conductor includes a winding portion wound around a coil axis extending in a direction parallel to the bottom surface of the base body.

A circuit board according to one or more embodiments of the present invention comprises at least one of the above coil components.

An electronic device according to one or more embodiments of the present invention comprises the above circuit board.

ADVANTAGEOUS EFFECTS

In one or more embodiments of the present invention, it is possible to inhibit occurrence of the eddy current loss in the coil component including the reinforcement portion.

DESCRIPTION OF THE EMBODIMENTS

Various embodiments of the present invention will be hereinafter described with reference to the accompanying drawings. Elements common to a plurality of drawings are denoted by the same reference signs throughout the plurality of drawings. For convenience of explanation, the drawings are not necessarily drawn to scale.

Figure 1:
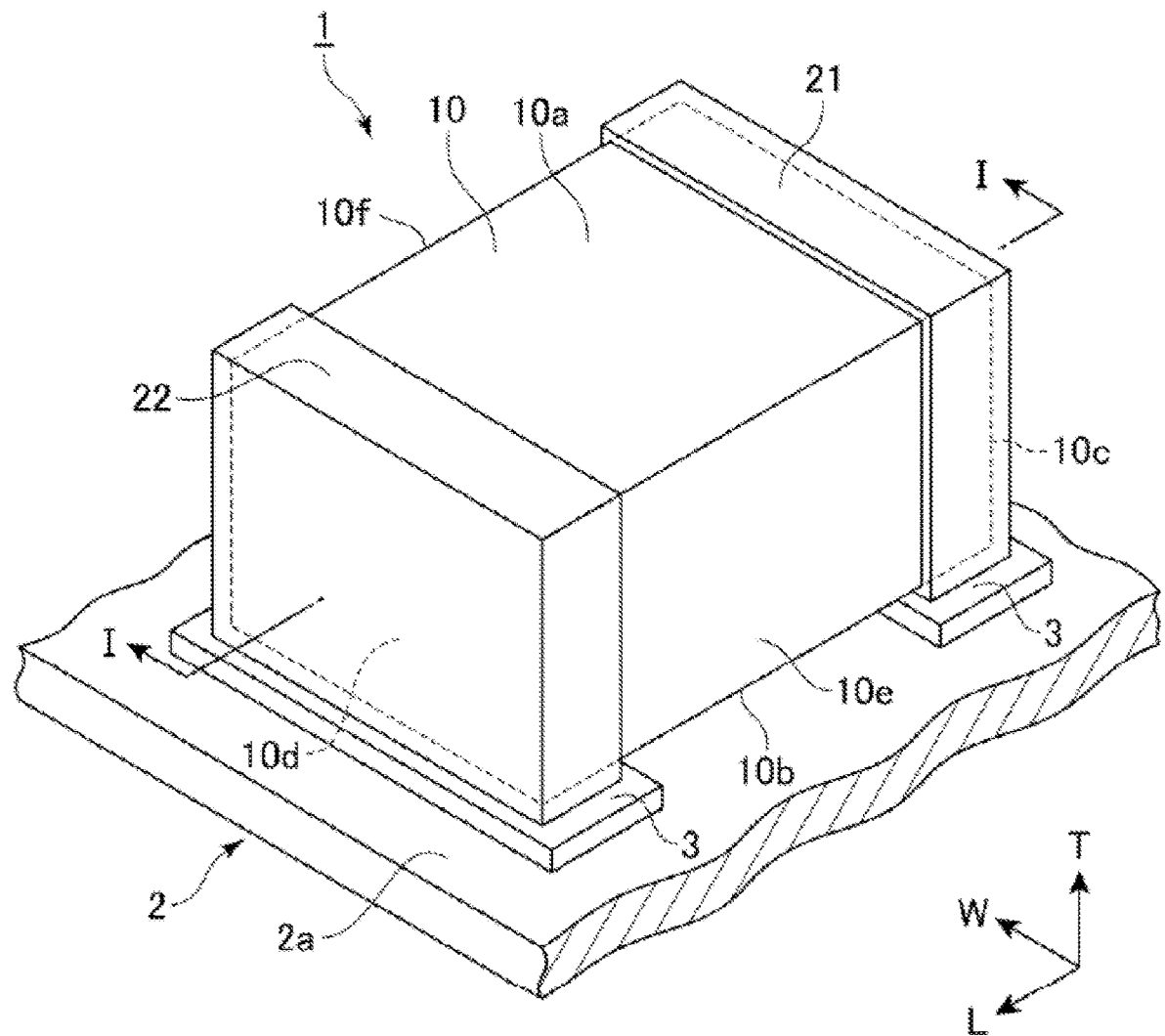
FIG. 1 is a perspective view of a coil component according to one embodiment of the invention.
Figure 2A:
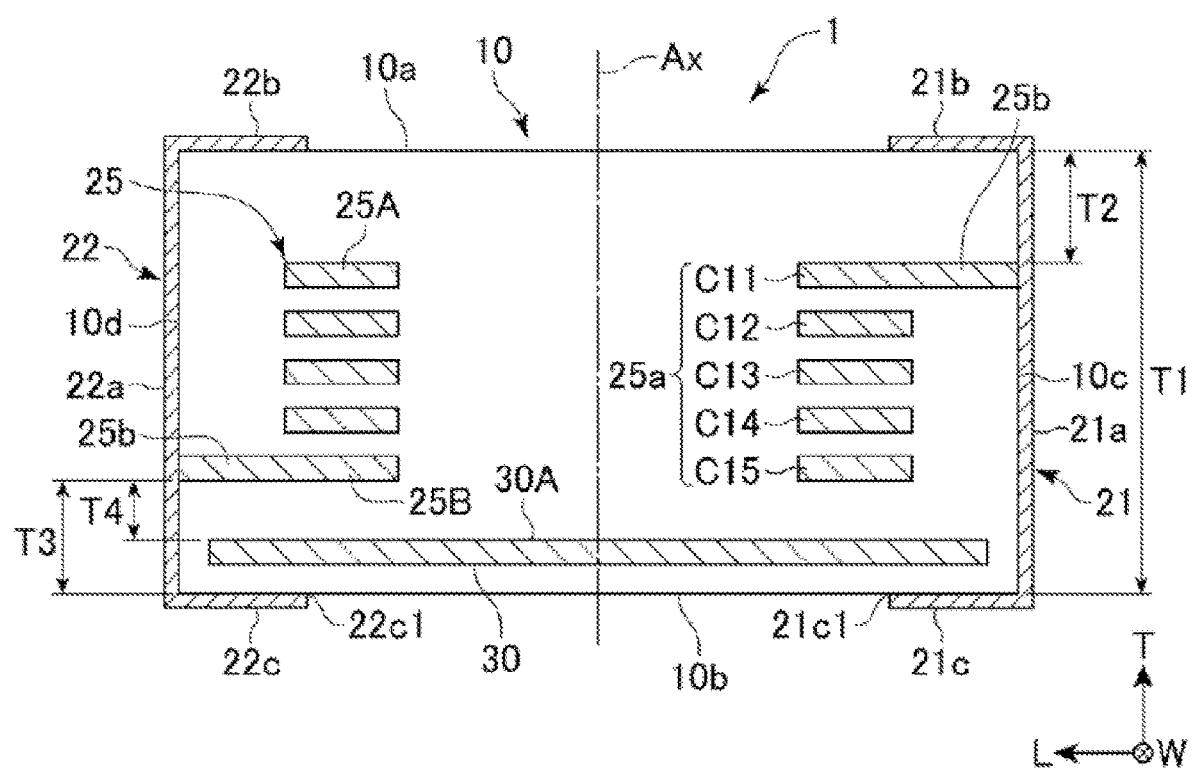
FIG. 2A schematically shows a longitudinal section of the coil component along the line I-I in FIG. 1.
Figure 2B:
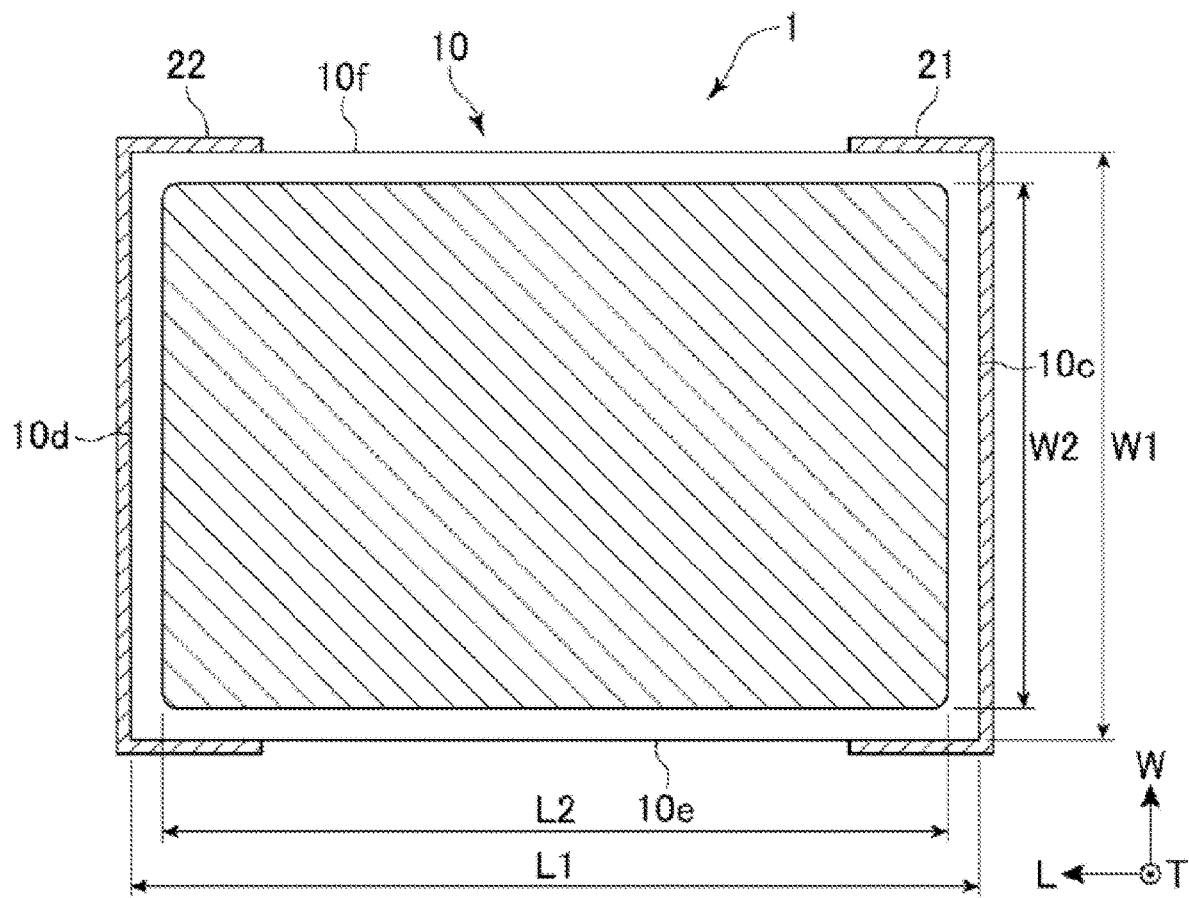
FIG. 2B is a transparent view of the coil component of FIG. 1 as viewed from above.

A coil component 1 according to one embodiment of the invention will be hereinafter described with reference to FIGS. 1 to 3. FIG. 1 is a perspective view of the coil component 1 according to one embodiment of the invention, FIG. 2A schematically shows a longitudinal section of the coil component 1 along the line I-I in FIG. 1, and FIG. 2B is a transparent view of the coil component 1 as viewed from above.

The coil component 1 may be, for example, an inductor, a transformer, a filter, a reactor, and any one of various other coil components. The coil component 1 may alternatively be a coupled inductor, a choke coil, or any one of various other magnetically coupled coil components. Applications of the coil component 1 are not limited to those explicitly described herein. By way of one example of the coil component 1, FIGS. 1 to 2B show a laminated inductor. The laminated inductor shown is an example of the coil component 1 to which the invention can be applied. The invention can also be applied to various coil components other than the laminated inductor. The coil component 1 may be a coil component having a planar coil or a wire-wound coil.

The coil component 1 in the embodiment shown includes an insulating base body 10, a coil conductor 25 disposed in the base body 10, an external electrode 21 electrically connected to one end of the coil conductor 25, an external electrode 22 electrically connected to the other end of the coil conductor 25, and a reinforcement portion 30.

The coil component 1 is mounted on a mounting substrate 2a. The coil component 1 and the mounting substrate 2a are a part of a circuit board 2. In other words, the circuit board 2 includes the coil component 1 and the mounting substrate 2a having the coil component 1 mounted thereon. The mounting substrate 2a has two land portions 3 provided thereon. The coil component 1 is mounted on the mounting substrate 2a by bonding the external electrodes 21, 22 to the corresponding land portions 3 of the mounting substrate 2a. The circuit board 2 can be installed in various electronic devices. Electronic devices in which the circuit board 2 may be installed include smartphones, tablets, game consoles, electrical components of automobiles, and various other electronic devices.

In this specification, a "length" direction, a "width" direction, and a "thickness" direction of the coil component 1 are referred to as an "L axis" direction, a "W axis" direction, and a "T axis" direction in FIG. 1, respectively, unless otherwise construed from the context.

The base body 10 is made of an insulating material and generally formed in a rectangular parallelepiped shape. As will be described later, the insulating material may be either a magnetic material or a nonmagnetic material. In one embodiment of the invention, the base body 10 has a length L1 (the dimension in the L axis direction) of 0.4 to 4.5 mm, a width W1 (the dimension in the W axis direction) of 0.2 to 3.2 mm, and a thickness T1 (the dimension in the T axis direction) of 0.1 to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10a, a second principal surface 10b, a first end surface 10c, a second end surface 10d, a first side surface 10e, and a second side surface 10f. These six surfaces define the outer periphery of the base body 10. The first principal surface 10a and the second principal surface 10b are at the opposite ends in the thickness direction, the first end surface 10c and the second end surface 10d are at the opposite ends in the length direction, and the first side surface 10e and the second side surface 10f are at the opposite ends in the width direction. The first principal surface 10a and the second principal surface 10b may be parallel to each other. The first end surface 10c and the second end surface 10d may be parallel to each other. The first side surface 10e and the second side surface 10f may be parallel to each other.

As shown in FIG. 1, the first principal surface 10a lies on the top side of the base body 10, and therefore, the first principal surface 10a may be herein referred to as "the top surface." Similarly, the second principal surface 10b may be referred to as "the bottom surface." The coil component 1 is disposed such that the second principal surface 10b faces the mounting substrate 2a, and therefore, the second principal surface 10b may be herein referred to as "the mounting surface." The top-bottom direction of the coil component 1 mentioned herein may refer to the top-bottom direction in FIG. 1. In other words, the top-bottom direction of the coil component 1 is defined such that the positive direction of the T axis along the T axis is referred to as "the top side," and the negative direction of the T axis is referred to as "the bottom side."

In one or more embodiments of the present invention, the external electrode 21 and the external electrode 22 are provided on the surface of the base body 10. The external electrode 21 includes a plate portion 21a, a top portion 21b, and a bottom portion 21c. The plate portion 21a has a plate-like shape and extends along the first end surface 10c of the base body 10, the top portion 21b extends from the top end of the plate portion 21a along the top surface 10a, and the bottom portion 21c extends from the bottom end of the plate portion 21a along the bottom surface 10b. The external electrode 22 includes a plate portion 22a, a top portion 22b, and a bottom portion 22c. The plate portion 22a has a plate-like shape and extends along the second end surface 10d of the base body 10, the top portion 22b extends from the top end of the plate portion 22a along the top surface 10a, and the bottom portion 22c extends from the bottom end of the plate portion 22a along the bottom surface 10b. In the embodiment shown, each of the external electrode 21 and the external electrode 22 also includes side portions that extends along the first side surface 10e and the second side surface 10f, respectively. The external electrodes 21 and 22 are separated from each other in the length direction. The external electrode 21 and the external electrode 22 are positioned such that the distal end 21c1 of the bottom portion 21c of the external electrode 21 and the distal end 22c1 of the bottom portion 22c of the external electrode 22 are opposed to each other in the L axis direction. In the embodiment shown, the distal end 21c1 and the distal end 22c1 extend along the W axis direction. The shapes and arrangements of the external electrodes 21, 22 are not limited to those specified in the drawings. For example, the external electrode 21 may be missing any one or all of the plate portion 21a, the top portion 21b, and the side portion. Similarly, the external electrode 22 may be missing any one or all of the plate portion 22a, the top portion 22b, and the side portion.

In one or more embodiments, the base body 10 is formed of an insulating material having a high insulation quality. Various magnetic or nonmagnetic materials may be used as the insulating material of the base body 10. The magnetic materials used for the base body 10 may be, for example, ferrite materials, soft magnetic metal materials, soft magnetic alloy materials, or any other known magnetic materials. The nonmagnetic materials used for the base body 10 may be, for example, silica ($SiO_2$), alumina ($Al_2O_3$), or other known nonmagnetic materials. The base body 10 may contain a resin.

In one or more embodiments, the coil conductor 25 is formed of a metal material and provided in the base body 10. The metal material used for the coil conductor 25 may be, for example, Ag, Pd, Cu, Al, or alloys of these metals. For example, the coil conductor 25 includes a winding portion 25a and lead-out conductors 25b. The winding portion 25a is wound spirally around a coil axis Ax extending along the thickness direction (the T axis direction), and the lead-out conductors 25b are led out from the opposite ends of the winding portion 25a to connect the opposite ends to the external electrodes 21, 22, respectively. In the embodiment shown, the coil axis Ax intersects the top surface 10a and the bottom surface 10b, but does not intersect the first and second end surfaces 10c and 10d and the first and second side surfaces 10e and 10f. In the embodiment shown, the winding portion 25a includes a plurality of conductor patters C11 to C15. The conductor patterns C11 to C15 extend along the planar direction perpendicular to the coil axis Ax and are separated from each other in the direction of the coil axis Ax. Each of the conductor patterns C11 to C15 is electrically connected to adjacent conductor patterns through the vias (not shown). In this way, the winding portion 25a of the coil conductor 25 is constituted by the conductor patterns C11 to C15 and the vias.

In one or more embodiments, the coil conductor 25 has a first coil surface 25A and a second coil surface 25B. The first coil surface 25A faces the top surface 10a of the base body 10, and the second coil surface 25B faces the bottom surface 10b of the base body 10. The first coil surface 25A may also be referred to as a top surface, and the second coil surface 25B may also be referred to as a bottom surface. In one or more embodiments, the interval T3 between the second coil surface 25B of the coil conductor 25 and the bottom surface 10b of the base body 10 is larger than the interval T2 between the first coil surface 25A of the coil conductor 25 and the top surface 10a of the base body 10. This reserves an installation space for the reinforcement portion 30 in the base body 10. The following is a description of the reinforcement portion 30.

In one or more embodiments, the reinforcement portion 30 disposed in the base body 10 is positioned between the coil conductor 25 and the bottom surface 10b of the base body 10. In one or more embodiments, the reinforcement portion 30 has a plate-like shape and extends in parallel with the bottom surface 10b of the base body 10. The reinforcement portion 30 has a top surface 30A that faces the second coil surface 25B of the coil conductor 25. In the embodiment shown, the reinforcement portion 30 is provided in a region defined, in a top view (as shown in FIG. 2B), by a rectangle with a length L2 and a width W2. The length L2 is smaller than the length L1, and the width W2 is smaller than the width W1, and therefore, the reinforcement portion 30 is not exposed out of the base body 10. In one or more embodiments of the present invention, the reinforcement portion 30 may be exposed from the first end surface 10c and connected with the external electrode 21. In one or more embodiments of the present invention, the reinforcement portion 30 may be exposed from the second end surface 10d and connected with the external electrode 22.

In one or more embodiments of the present invention, the reinforcement portion 30 is configured and positioned so as to overlap, in the top view (as shown in FIG. 2B), with at least a part of the distal end 21c1 of the bottom portion 21c of the external electrode 21 and at least a part of the distal end 22c1 of the bottom portion 22c of the external electrode 22. In mounting the coil component 1 on the mounting substrate 2a, the base body 10 receives a large stress at the bottom surface 10b from the distal end 21c1 of the external electrode 21 and the distal end 22c1 of the external electrode 22. Therefore, the base body 10 is prone to cracking near the distal end 21c1 of the external electrode 21 and the distal end 22c1 of the external electrode 22. In one or more embodiments of the present invention, the reinforcement portion 30 overlaps, in the top view, with at least a part of the distal end 21c1 of the first bottom portion 21c of the external electrode 21 and at least a part of the distal end 22c1 of the second bottom portion 22c of the external electrode 22, and therefore, the reinforcement portion 30 reinforces the portion of the base body 10 where the stress concentrates. Further, the reinforcement portion 30 can prevent expansion of cracking that has occurred in the base body 10. For example, even when cracking occurs in the base body 10 near the distal end 21c1 of the external electrode 21 and the distal end 22c1 of the external electrode 22, the reinforcement portion 30 prevents the cracking from expanding into the region above the reinforcement portion 30 where the coil conductor 25 is disposed.

In one or more embodiments of the present invention, the reinforcement portion 30 overlaps, in the top view, with at least 50% of the distal end 21c1 in the W axis direction. In one or more embodiments of the present invention, the reinforcement portion 30 overlaps, in the top view, with at least 50% of the distal end 22c1 in the W axis direction. In one or more embodiments of the present invention, the reinforcement portion 30 overlaps, in the top view, with 90% or less of the distal end 22c1 in the W axis direction. In this way, the reinforcement portion 30 is not exposed out of the base body 10 in the W axis direction.

In one or more embodiments of the present invention, the reinforcement portion 30 is positioned closer to the bottom surface 10b of the base body 10 in the T axis direction than is the middle point between the second coil surface 25B of the coil conductor 25 and the bottom surface 10b of the base body 10. For example, the reinforcement portion 30 is positioned such that the top surface 30A thereof is positioned closer to the bottom surface 10b of the base body 10 in the T axis direction than is the middle point between the second coil surface 25B of the coil conductor 25 and the bottom surface 10b of the base body 10. In the embodiment shown, the interval T4 between the second coil surface 25B of the coil conductor 25 and the top surface 30A of the reinforcement portion 30 is larger than a half of the interval T3 between the second coil surface 25B of the coil conductor 25 and the bottom surface 10b of the base body 10. The reinforcement portion 30 disposed in the base body 10 is electrically insulated from the coil conductor 25.

In one or more embodiments of the present invention, the reinforcement portion 30 is formed of a metal material. The metal material used for the reinforcement portion 30 may be a metal such as Cu, Ag, and Ni or an alloy containing at least one of these metals. The material used for the reinforcement portion 30 may be Cu, Ag, or other nonmagnetic (diamagnetic) metal materials. Use of a nonmagnetic metal material for the reinforcement portion 30 inhibits occurrence of an eddy current in the reinforcement portion 30 caused by the magnetic flux generated from the coil conductor 25. The proportion of the metal material in the reinforcement portion 30 is 90 vol % or larger.

The following describes a method of manufacturing the coil component 1 according to one or more embodiments. In one or more embodiments of the present invention, the base body 10 of the coil component 1 is produced by the sheet lamination method in which insulating sheets are stacked together. The first step of the sheet lamination method for producing the coil component 1 is to prepare the insulating sheets. The insulating sheets are formed from a slurry obtained by kneading material particles made of a magnetic material or a nonmagnetic material with a resin. The slurry is molded into the insulating sheets using a sheet molding machine such as a doctor blade sheet molding machine. The material particles may be particles of a magnetic material, particles of a nonmagnetic material, or a mixture of these particles. The particles of the magnetic material may be, for example, particles of a ferrite material, particles of a soft magnetic metal or a soft magnetic alloy, or particles of other magnetic materials. The particles of the nonmagnetic material may be, for example, glass particles, ceramic particles, alumina particles, or particles of other nonmagnetic materials. The average particle size of the material particles may be 0.1 to 30 μm. The resin material kneaded together with the material particles may be, for example, a polyvinyl butyral (PVB) resin, an epoxy resin, or any other resin materials having an excellent insulation property.

The insulating sheets are cut into shape and penetrated in the thickness direction to form through-holes at predetermined positions. Next, a conductive paste is applied to the insulating sheets cut into shape by a known method such as screen printing, thereby forming a plurality of unfired conductor patterns that will later form the conductor patterns C11 after firing. Likewise, the conductive paste is also applied to other insulating sheets, thereby forming a plurality of unfired conductor patterns that will later form the conductor patterns C12 to C15 after firing. In forming the unfired conductor patterns, the conductive paste is filled into the through-holes of the insulating sheets to form unfired vias. The conductive paste for forming the conductor patterns C11 to C15 is obtained by, for example, kneading Ag, Pd, Cu, Al, or an alloy of these metals with a resin. Further, a conductive paste is applied to still other insulating sheets by screen printing or other methods, thereby forming a plurality of unfired conductor plates that will later form the reinforcement portions 30 after firing. The conductive paste for forming the reinforcement portions 30 is obtained by, for example, kneading Cu, Ag, Ni, or an alloy of these metals with a resin.

In the way described above, the unfired conductor patterns corresponding to the conductor patterns C11 to C15, the unfired vias, and the unfired conductor plates are formed on the insulating sheets, and these insulating sheets are stacked together with insulating sheets having no conductor formed thereon to obtain a mother laminate. The insulating sheets having no conductor formed thereon are disposed at the top end and the bottom end of the mother laminate. The insulating sheets disposed at the top end and the bottom end of the mother laminate will later form a top cover layer and a bottom cover layer after firing. The top cover layer (not denoted by a reference sign) is disposed between the first coil surface 25A of the coil conductor 25 and the top surface 10a, and the bottom cover layer (not denoted by a reference sign) is disposed between the second coil surface 25B of the coil conductor 25 and the bottom surface 10b. One or more insulating sheets having no conductive paste applied thereto may be disposed between the insulating sheet having the unfired conductor plate formed thereon and the insulating sheet having formed thereon the unfired conductor pattern for forming the conductor pattern C11. The presence of the one or more insulating sheets having no conductive paste applied thereto reserves the interval between the reinforcement portion 30 and the coil conductor 25.

Next, the mother laminate is diced using a cutter such as a dicing machine or a laser processing machine to obtain a chip laminate.

Next, the chip laminate is degreased and then heated. The chip laminate is heated, for example, at 400 to 900° C. for 20 to 120 minutes. Through this heat treatment, the insulating sheets and the conductive paste are fired to form the base body 10 containing the coil conductor 25 and the reinforcement portion 30.

Following the heat treatment, a conductive paste is applied to the surface of the chip laminate (that is, the base body 10) to form the external electrode 21 and the external electrode 22. The coil component 1 is obtained through the above steps.

The manufacturing method described above is susceptible of omitting a part of the steps, adding steps not explicitly referred to, and/or reordering the steps. A procedure subjected to such omission, addition, or reordering is also included in the scope of the present invention unless diverged from the purport of the present invention.

The method of manufacturing the coil component 1 is not limited to the method described above. The coil component 1 may be produced by a lamination method other than the sheet lamination method (e.g., the printing lamination method), the thin film process, the compression molding process, or other known methods. When the coil component 1 is manufactured by the thin film process, the heat treatment is performed at a lower temperature than in the sheet lamination method. Specifically, in the thin film process, the base body 10 is produced by kneading a magnetic material such as metal magnetic particles and/or a nonmagnetic material such as glass with a resin to obtain a mixed resin material and curing the resin.

Figure 3A:
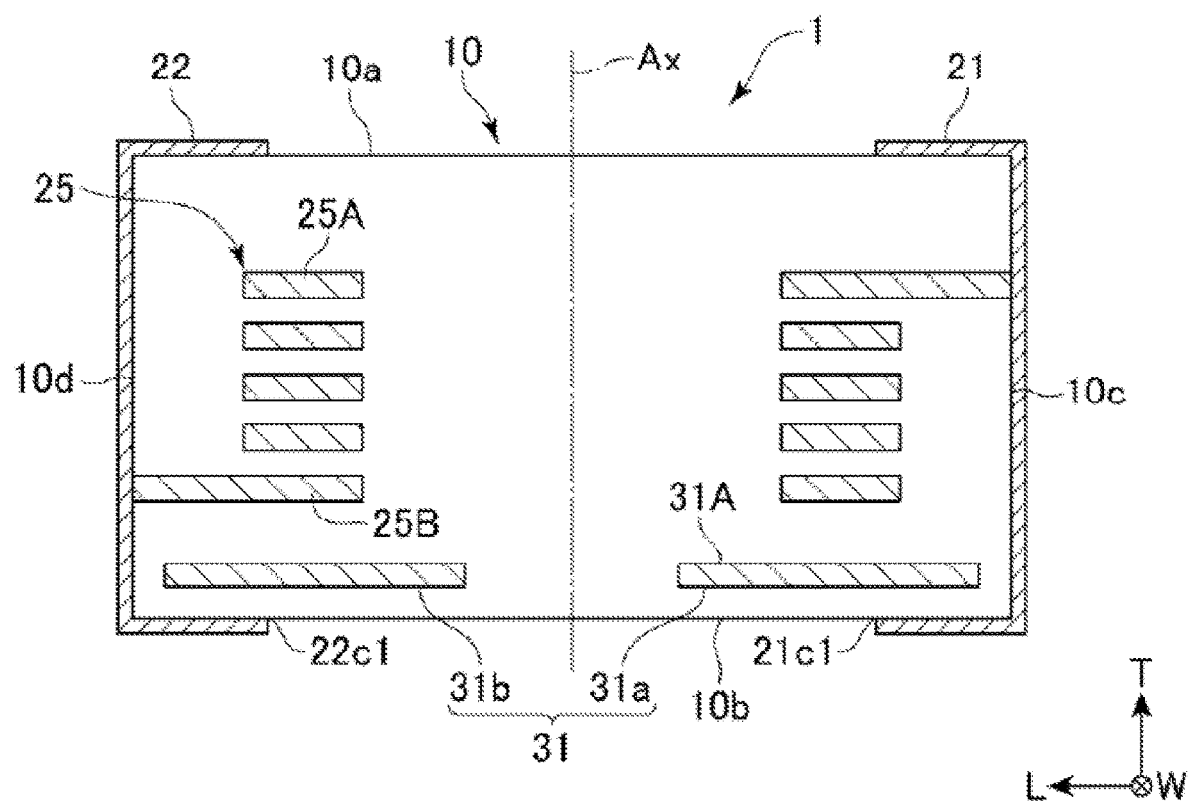
FIG. 3A schematically shows a longitudinal section of a coil component according to another embodiment of the present invention.
Figure 3B:
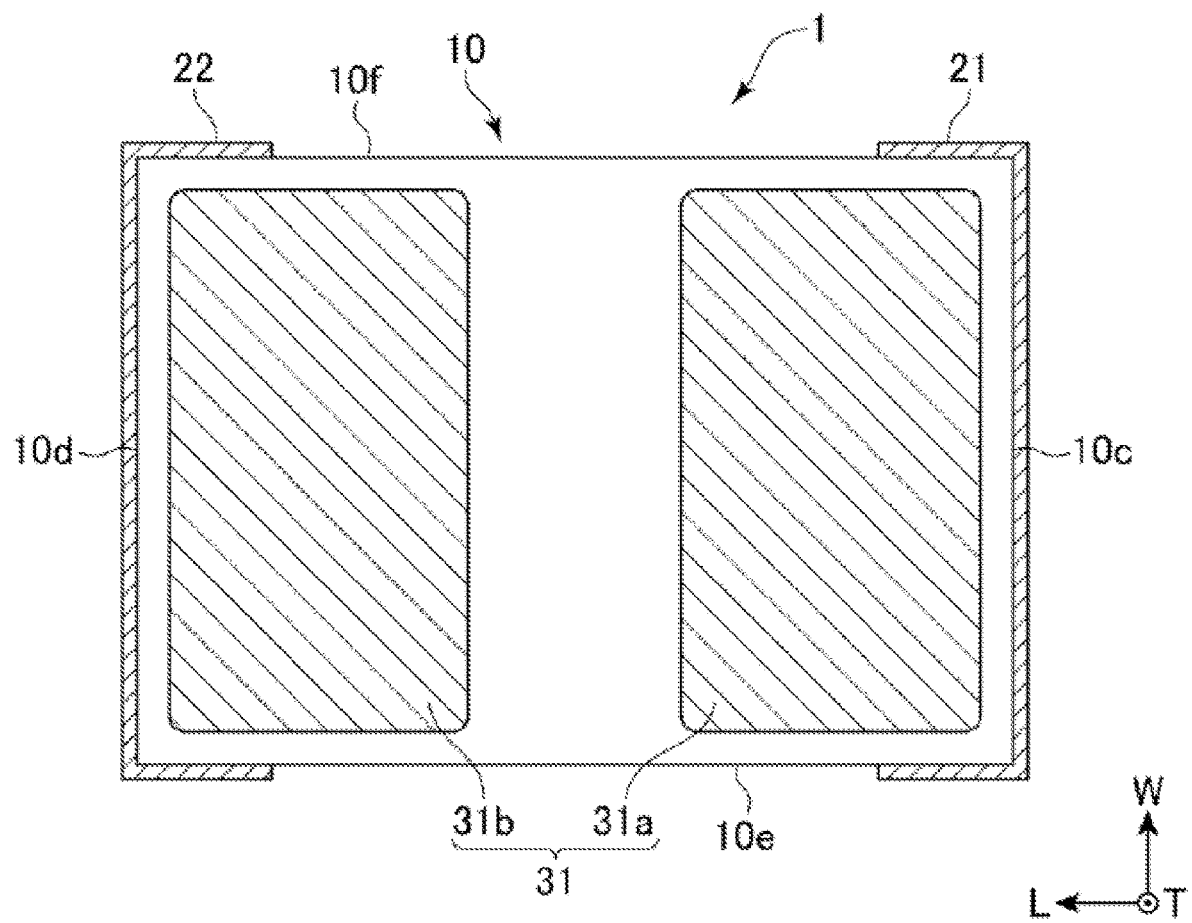
FIG. 3B is a transparent view of the coil component of FIG. 3A as viewed from above.

Next, a coil component 1 according to another embodiment of the present invention will be described with reference to FIGS. 3A and 3B. The coil component 1 shown in FIGS. 3A and 3B is different from the coil component 1 shown in FIGS. 2A and 2B in that the reinforcement portion 30 is replaced with a reinforcement portion 31. The features common to the coil component 1 shown in FIGS. 3A and 3B and the coil component 1 shown in FIGS. 2A and 2B are not described here.

The reinforcement portion 31 includes a first reinforcement member 31a and a second reinforcement member 31b spaced apart from the first reinforcement member 31a. The first reinforcement member 31a and the second reinforcement member 31b are spaced apart from each other in the L axis direction. A part of the base body 10 mediates between the first reinforcement member 31a and the second reinforcement member 31b. Therefore, the first reinforcement member 31a and the second reinforcement member 31b are electrically insulated.

In one or more embodiments of the present invention, the first reinforcement member 31a is configured and positioned so as to cover, in the top view (as shown in FIG. 3B), at least a part of the distal end 21c1 of the bottom portion 21c of the external electrode 21. In one or more embodiments of the present invention, the second reinforcement member 31b is configured and positioned so as to overlap, in the top view, with at least a part of the distal end 22c1 of the bottom portion 22c of the external electrode 22.

In the embodiment shown, both the first reinforcement member 31a and the second reinforcement member 31b are positioned closer to the bottom surface 10b of the base body 10 in the T axis direction than is the middle point between the second coil surface 25B of the coil conductor 25 and the bottom surface 10b of the base body 10. In one or more embodiments of the present invention, the reinforcement portion 31 is positioned such that the top surface 31A thereof is positioned closer to the bottom surface 10b of the base body 10 than is the middle point between the second coil surface 25B of the coil conductor 25 and the bottom surface 10b of the base body 10. The top surface 31A of the reinforcement portion 31 may be represented by one of the top surface of the first reinforcement member 31a and the top surface of the second reinforcement member 31b that is closer to the second coil surface 25B of the coil conductor 25. In the embodiment shown, the first reinforcement member 31a and the second reinforcement member 31b are disposed at the same position in the T axis direction.

Figure 4A:
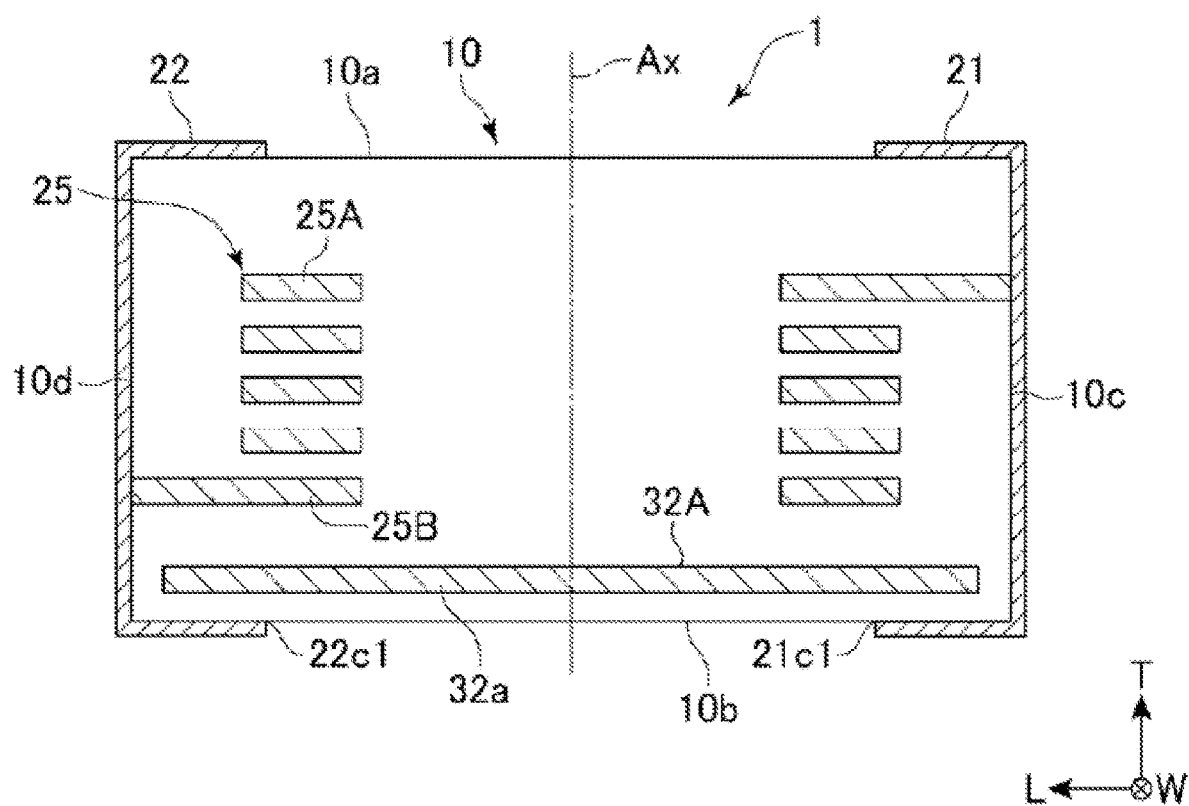
FIG. 4A schematically shows a longitudinal section of a coil component according to another embodiment of the present invention.
Figure 4B:
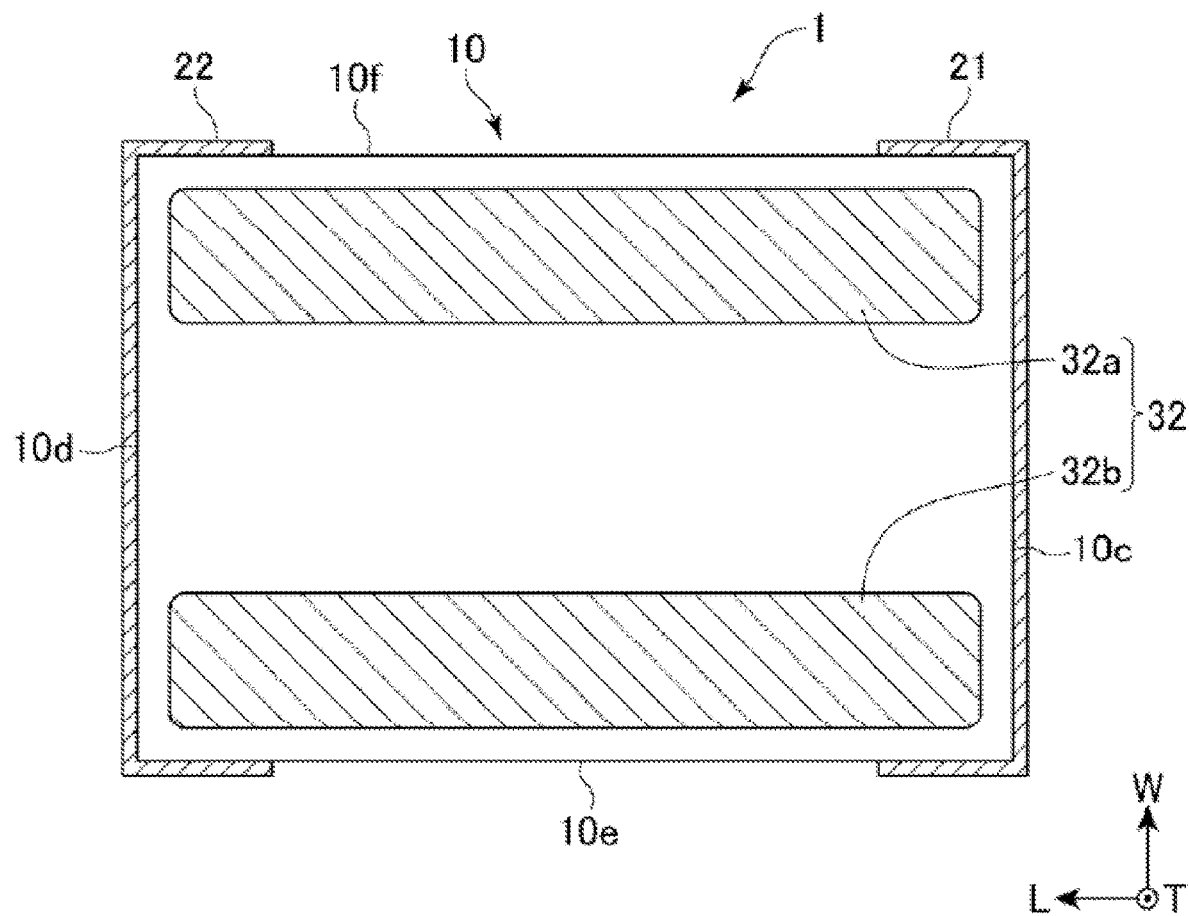
FIG. 4B is a transparent view of the coil component of FIG. 4A as viewed from above.

Next, a coil component 1 according to another embodiment of the present invention will be described with reference to FIGS. 4A and 4B. The coil component 1 shown in FIGS. 4A and 4B is different from the coil component 1 shown in FIGS. 2A and 2B in that the reinforcement portion 30 is replaced with a reinforcement portion 32. The features common to the coil component 1 shown in FIGS. 4A and 4B and the coil component 1 shown in FIGS. 2A and 2B are not described here.

The reinforcement portion 32 includes a first reinforcement member 32a and a second reinforcement member 32b spaced apart from the first reinforcement member 32a. The first reinforcement member 32a and the second reinforcement member 32b are spaced apart from each other in the W axis direction. A part of the base body 10 mediates between the first reinforcement member 32a and the second reinforcement member 32b. Therefore, the first reinforcement member 32a and the second reinforcement member 32b are electrically insulated.

In one or more embodiments of the present invention, the first reinforcement member 32a is configured and positioned so as to overlap, in the top view (as shown in FIG. 4B), with at least a part of the distal end 21c1 of the bottom portion 21c of the external electrode 21 and at least a part of the distal end 22c1 of the bottom portion 22c of the external electrode 22. In one or more embodiments of the present invention, the second reinforcement member 32b is configured and positioned so as to overlap, in the top view, with at least a part of the distal end 21c1 of the bottom portion 21c of the external electrode 21 and at least a part of the distal end 22c1 of the bottom portion 22c of the external electrode 22. In one or more embodiments of the present invention, at least one of the first reinforcement member 32a and the second reinforcement member 32b may be exposed from the first end surface 10c and connected with the external electrode 21. In one or more embodiments of the present invention, at least one of the first reinforcement member 32a and the second reinforcement member 32b may be exposed from the second end surface 10d and connected with the external electrode 22.

In the embodiment shown, both the first reinforcement member 32a and the second reinforcement member 32b are positioned closer to the bottom surface 10b of the base body 10 in the T axis direction than is the middle point between the second coil surface 25B of the coil conductor 25 and the bottom surface 10b of the base body 10. In one or more embodiments of the present invention, the reinforcement portion 32 is positioned such that the top surface 32A thereof is positioned closer to the bottom surface 10b of the base body 10 than is the middle point between the second coil surface 25B of the coil conductor 25 and the bottom surface 10b of the base body 10.

Figure 5A:
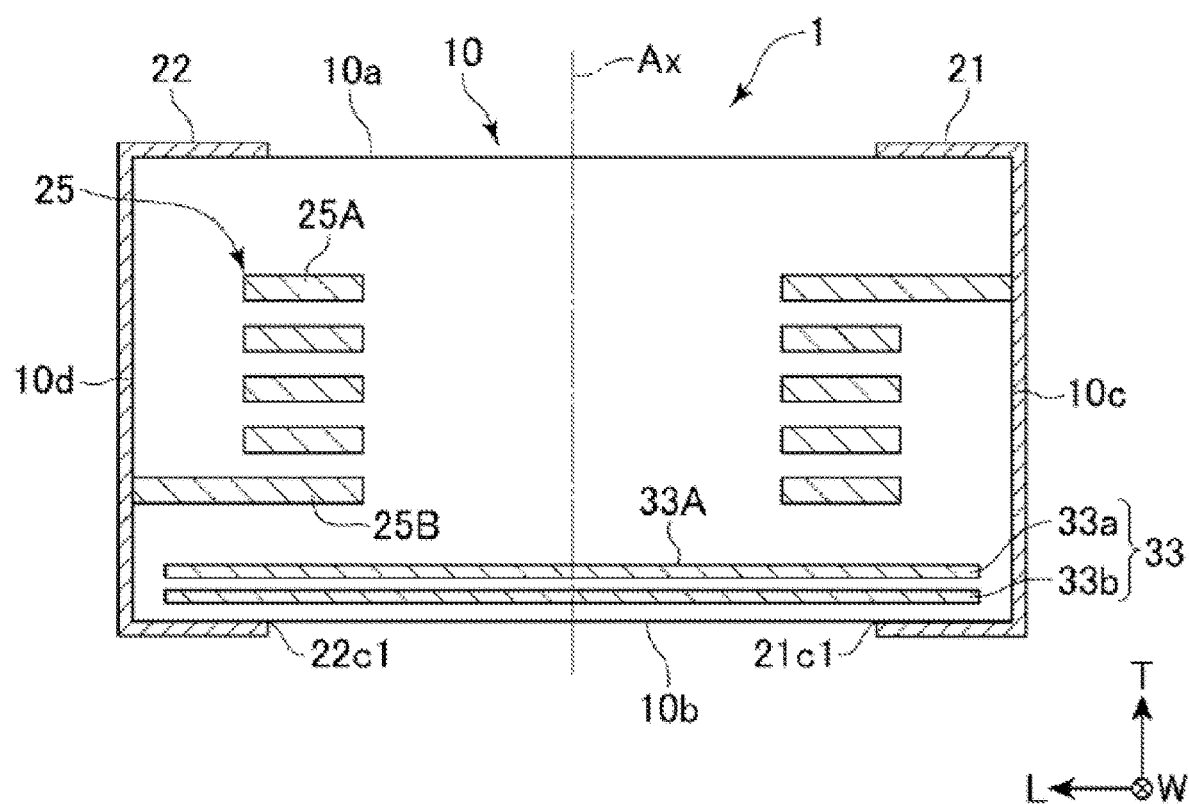
FIG. 5A schematically shows a longitudinal section of a coil component according to another embodiment of the present invention.
Figure 5B:
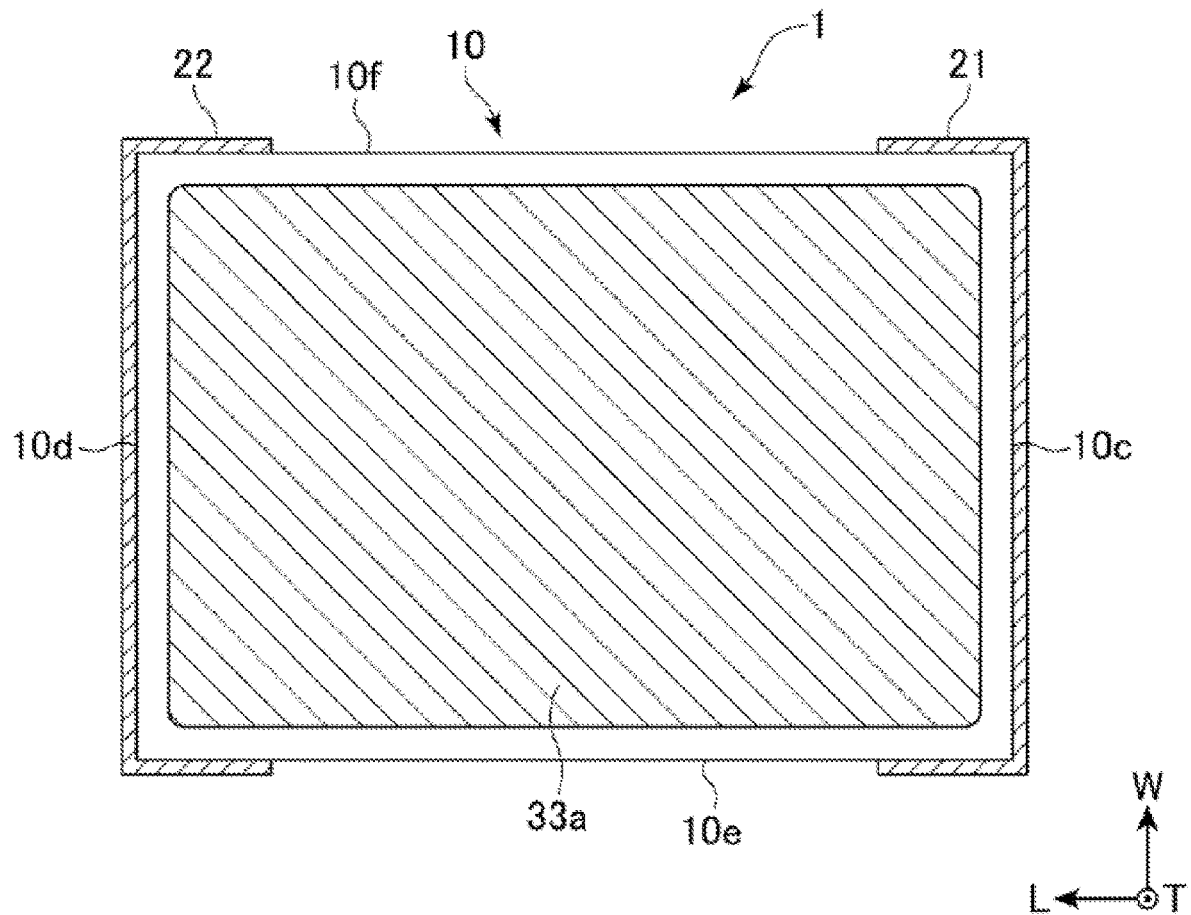
FIG. 5B is a transparent view of the coil component of FIG. 5A as viewed from above.

Next, a coil component 1 according to another embodiment of the present invention will be described with reference to FIGS. 5A and 5B. The coil component 1 shown in FIGS. 5A and 5B is different from the coil component 1 shown in FIGS. 2A and 2B in that the reinforcement portion 30 is replaced with a reinforcement portion 33. The features common to the coil component 1 shown in FIGS. 5A and 5B and the coil component 1 shown in FIGS. 2A and 2B are not described here.

The reinforcement portion 33 includes a first reinforcement member 33a and a second reinforcement member 33b spaced apart from the first reinforcement member 33a. The first reinforcement member 33a and the second reinforcement member 33b are spaced apart from each other in the T axis direction. The first reinforcement member 33a is positioned above the second reinforcement member 33b (on the positive side of the second reinforcement member 33b in the T axis direction). A part of the base body 10 mediates between the first reinforcement member 33a and the second reinforcement member 33b. Therefore, the first reinforcement member 33a and the second reinforcement member 33b are electrically insulated.

In one or more embodiments of the present invention, both the first reinforcement member 33a and the second reinforcement member 33b are configured and positioned so as to cover, in the top view (as shown in FIG. 5B), at least a part of the distal end 21c1 of the bottom portion 21c of the external electrode 21 and at least a part of the distal end 22c1 of the bottom portion 22c of the external electrode 22. In one or more embodiments of the present invention, at least one of the first reinforcement member 33a and the second reinforcement member 33b may be exposed from the first end surface 10c and connected with the external electrode 21. In one or more embodiments of the present invention, at least one of the first reinforcement member 33a and the second reinforcement member 33b may be exposed from the second end surface 10d and connected with the external electrode 22.

In the embodiment shown, both the first reinforcement member 33a and the second reinforcement member 33b are positioned closer to the bottom surface 10b of the base body 10 in the T axis direction than is the middle point between the second coil surface 25B of the coil conductor 25 and the bottom surface 10b of the base body 10. In one or more embodiments of the present invention, the reinforcement portion 33 is positioned such that the top surface 33A thereof is positioned closer to the bottom surface 10b of the base body 10 than is the middle point between the second coil surface 25B of the coil conductor 25 and the bottom surface 10b of the base body 10. The top surface 33A of the reinforcement portion 33 is represented by the top surface of the first reinforcement member 33a since the first reinforcement member 33a is positioned above the second reinforcement member 33b.

Figure 6A:
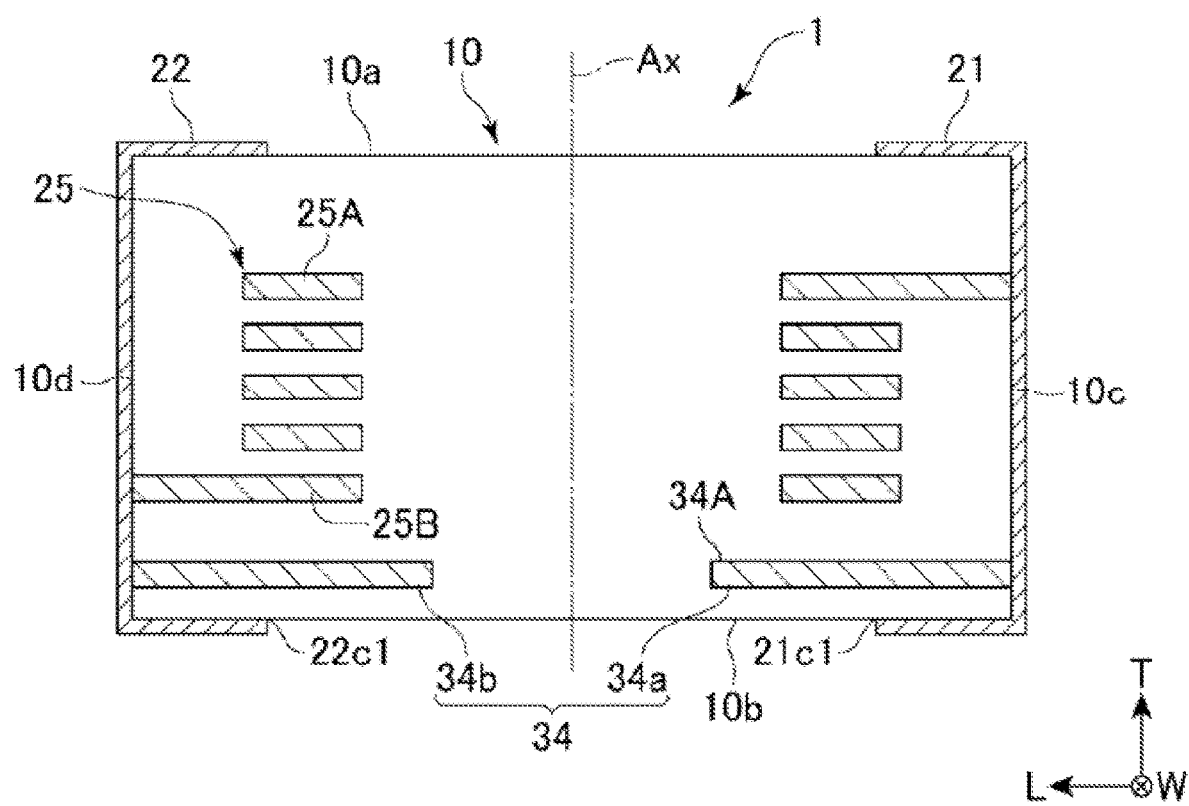
FIG. 6A schematically shows a longitudinal section of a coil component according to another embodiment of the present invention.
Figure 6B:
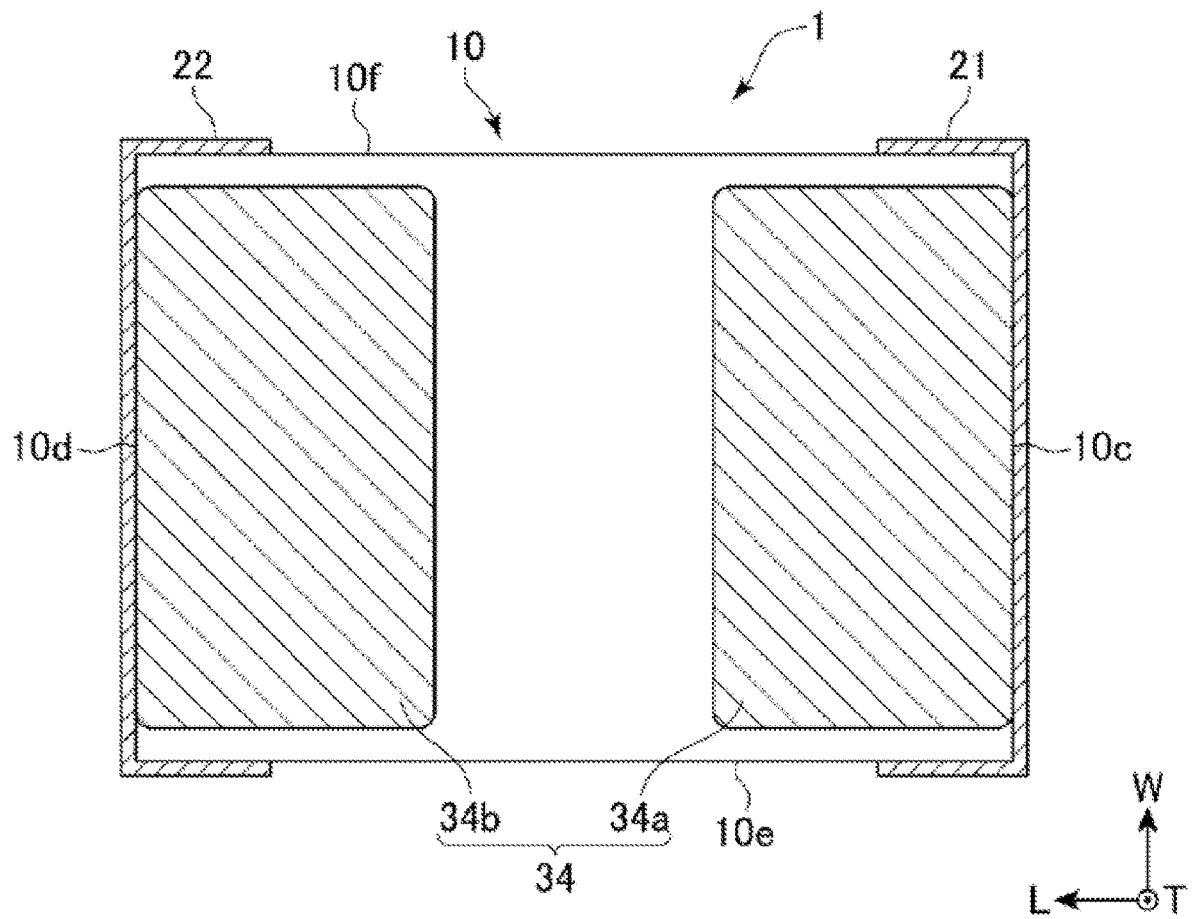
FIG. 6B is a transparent view of the coil component of FIG. 6A as viewed from above.

Next, a coil component 1 according to another embodiment of the present invention will be described with reference to FIGS. 6A and 6B. The coil component 1 shown in FIGS. 6A and 6B is different from the coil component 1 shown in FIGS. 3A and 3B in that the reinforcement portion 31 is replaced with a reinforcement portion 34. The features common to the coil component 1 shown in FIGS. 6A and 6B and the coil component 1 shown in FIGS. 3A and 3B are not described here.

The reinforcement portion 34 includes a first reinforcement member 34a and a second reinforcement member 34b spaced apart from the first reinforcement member 34a. In one or more embodiments of the present invention, the first reinforcement member 34a is connected with the external electrode 21. In one or more embodiments of the present invention, the second reinforcement member 34b is connected with the external electrode 22. In the embodiment shown, both the first reinforcement member 34a and the second reinforcement member 34b are connected with a corresponding external electrode, but it is also possible that only one of the first reinforcement member 34a and the second reinforcement member 34b is connected with an external electrode. Specifically, it is possible that the first reinforcement member 34a is connected with the external electrode 21, whereas the second reinforcement member 34b is not connected with the external electrode 22. Alternatively, it is possible that the second reinforcement member 34b is connected with the external electrode 22, whereas the first reinforcement member 34a is not connected with the external electrode 21.

Figure 7A:
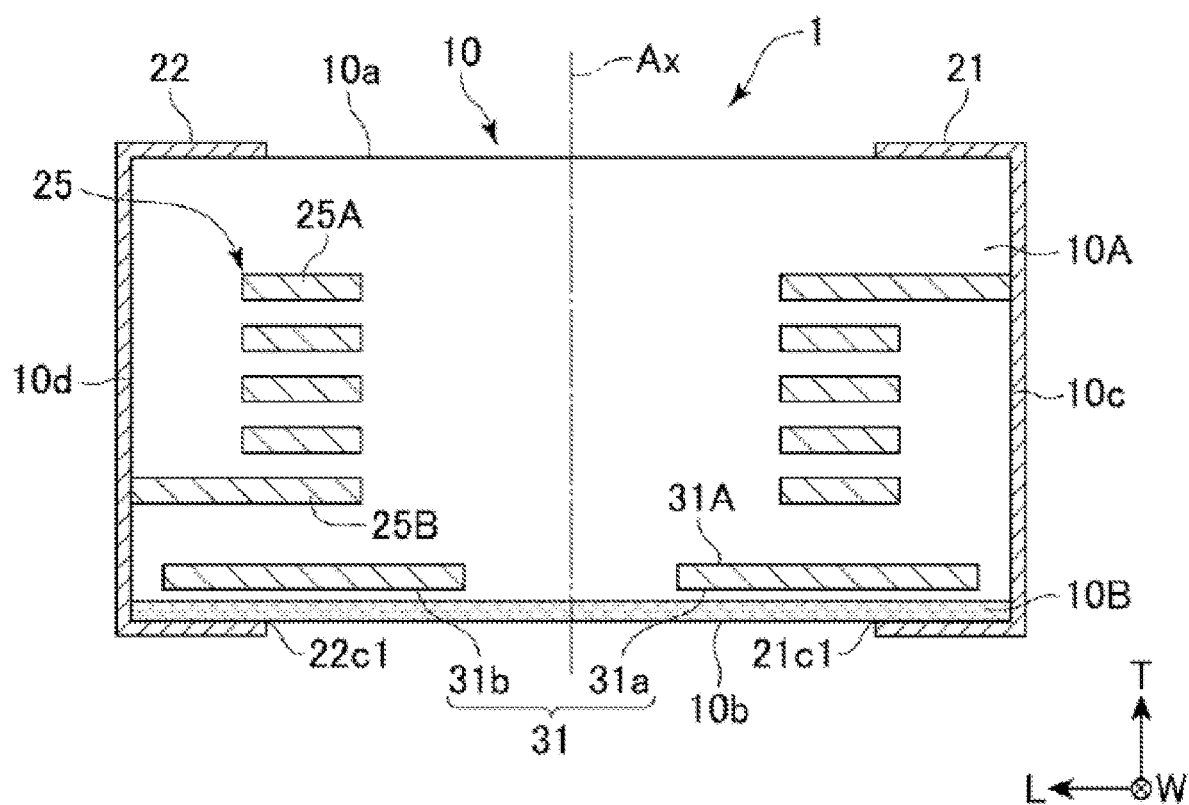
FIG. 7A schematically shows a longitudinal section of a coil component according to another embodiment of the present invention.
Figure 7B:
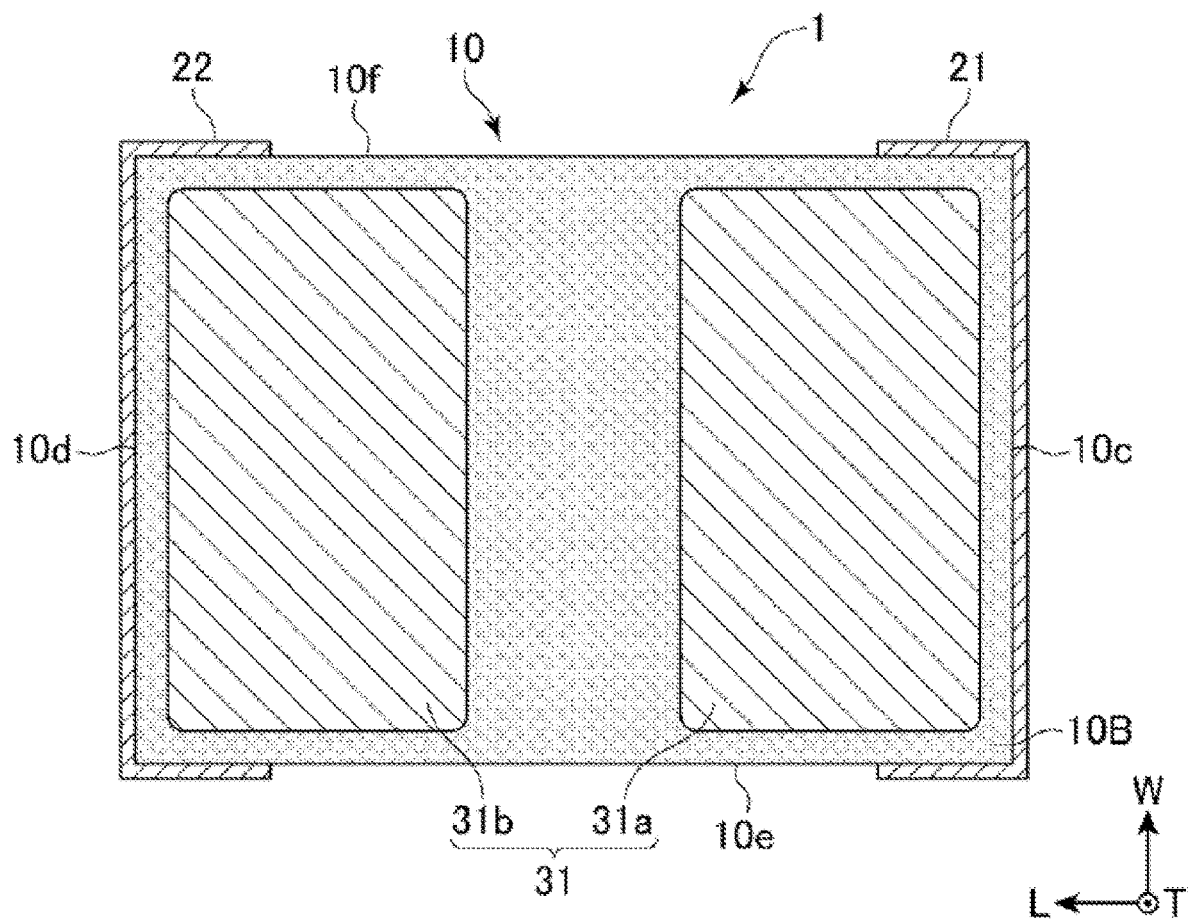
FIG. 7B is a transparent view of the coil component of FIG. 7A as viewed from above.

Next, a coil component 1 according to another embodiment of the present invention will be described with reference to FIGS. 7A and 7B. The coil component 1 shown in FIGS. 7A and 7B is different from the coil component 1 shown in FIGS. 3A and 3B in that the base body 10 is divided into the following regions: a first region 10A having a relatively low hardness, and a second region 10B having a relatively high hardness. The features common to the coil component 1 shown in FIGS. 7A and 7B and the coil component 1 shown in FIGS. 3A and 3B are not described here.

In one or more embodiments of the invention, the second region 10B has a higher Vickers hardness than the first region 10A. In order to make the Vickers hardness of the second region 10B higher than that of the first region 10A, the first region 10A and the second region 10B are formed of a nonmagnetic material containing, for example, silica ($SiO_2$) and alumina ($Al_2O_3$), and the content ratio of $SiO_2$ to $Al_2O_3$ in the second region 10B is made higher than that in the first region 10A.

In one or more embodiments of the invention, the second region 10B has a higher mechanical strength than the first region 10A. In order to make the mechanical strength of the second region 10B higher than that of the first region 10A, the second region 10B is formed of, for example, metal magnetic particles having a small average particle size, and the first region 10A is formed of, for example, metal magnetic particles having a large average particle size. The mechanical strength is represented by, for example, a bending strength.

In one or more embodiments of the invention, the first region 10A covers the coil conductor 25 and the reinforcement portion 31. In one or more embodiments of the present invention, the second region 10B is disposed between the reinforcement portion 31 and the bottom surface 10b of the base body 10. In the embodiment shown, the second region 10B is positioned at the bottom of the base body 10. In other words, the bottom surface of the second region 10B defines the bottom surface 10b of the base body 10. In the embodiment shown, the first region 10A is in contact with the second region 10B. In the embodiment shown, the first region 10A is positioned above the second region 10B. The base body 10 may include a region other than the first region 10A and the second region 10B.

In one or more embodiments of the present invention, the first region 10A may be formed of a nonmagnetic material. When the first region 10A is formed of a nonmagnetic material, its relative permittivity may be 8 or lower. The first region 10A may be formed of a magnetic material. When the first region 10A is formed of a magnetic material, its relative permittivity may be 40 or higher.

In one or more embodiments of the present invention, when the first region 10A is formed of a nonmagnetic material, the second region 10B is also formed of a nonmagnetic material. In one or more embodiments of the present invention, the second region 10B has a higher relative permittivity than the first region 10A. In other words, the first region 10A has a lower relative permittivity than the second region 10B. This reduces the parasitic capacitance of the coil conductor 25. In one or more embodiments of the present invention, when the first region 10A is formed of a magnetic material, the second region 10B is formed of a magnetic material or a nonmagnetic material. In one or more embodiments of the present invention, the second region 10B has a lower relative permeability than the first region 10A. In other words, the first region 10A has a higher relative permeability than the second region 10B. This increases the inductance of the coil component 1 and reduces the eddy current loss.

As described above, in mounting the coil component 1 on the mounting substrate 2a, the base body 10 receives a large stress at the bottom surface 10b from the distal end 21c1 of the external electrode 21 and the distal end 22c1 of the external electrode 22. In the embodiment shown, the external electrode 21 and the external electrode 22 are in contact with the second region 10B instead of the first region 10A. This inhibits a dent from occurring in the bottom surface 10b of the base body 10 at the portions contacting with the external electrode 21 and the external electrode 22 when a stress acts from the external electrode 22 to the base body 10 in mounting the coil component 1. As a result, cracking in the base body 10 can be inhibited.

The coil component 1 shown in FIGS. 7A and 7B may also be produced by the sheet lamination method described above. The difference from the manufacturing method of the coil component 1 shown in FIGS. 2A and 2B is that the insulating sheets for forming the first region 10A and the insulating sheets for forming the second region 10B are made of different materials.

Figure 8A:
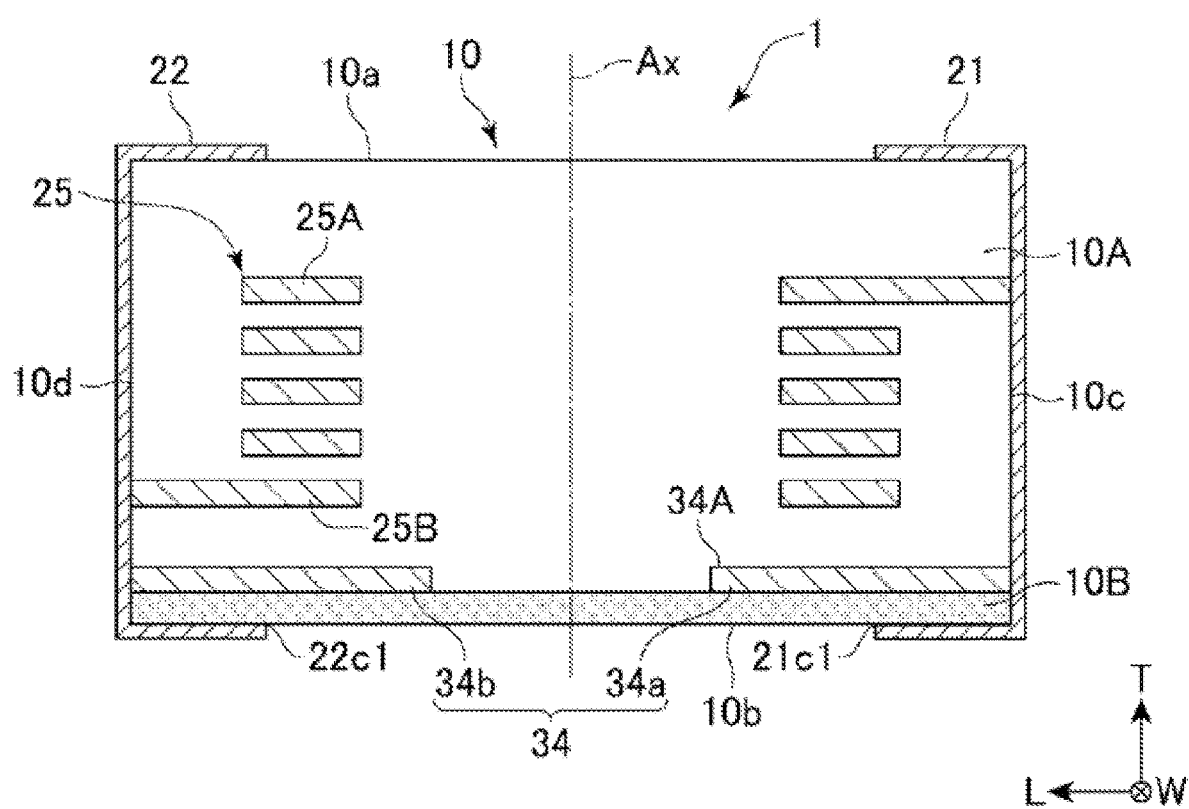
FIG. 8A schematically shows a longitudinal section of a coil component according to another embodiment of the present invention.
Figure 8B:
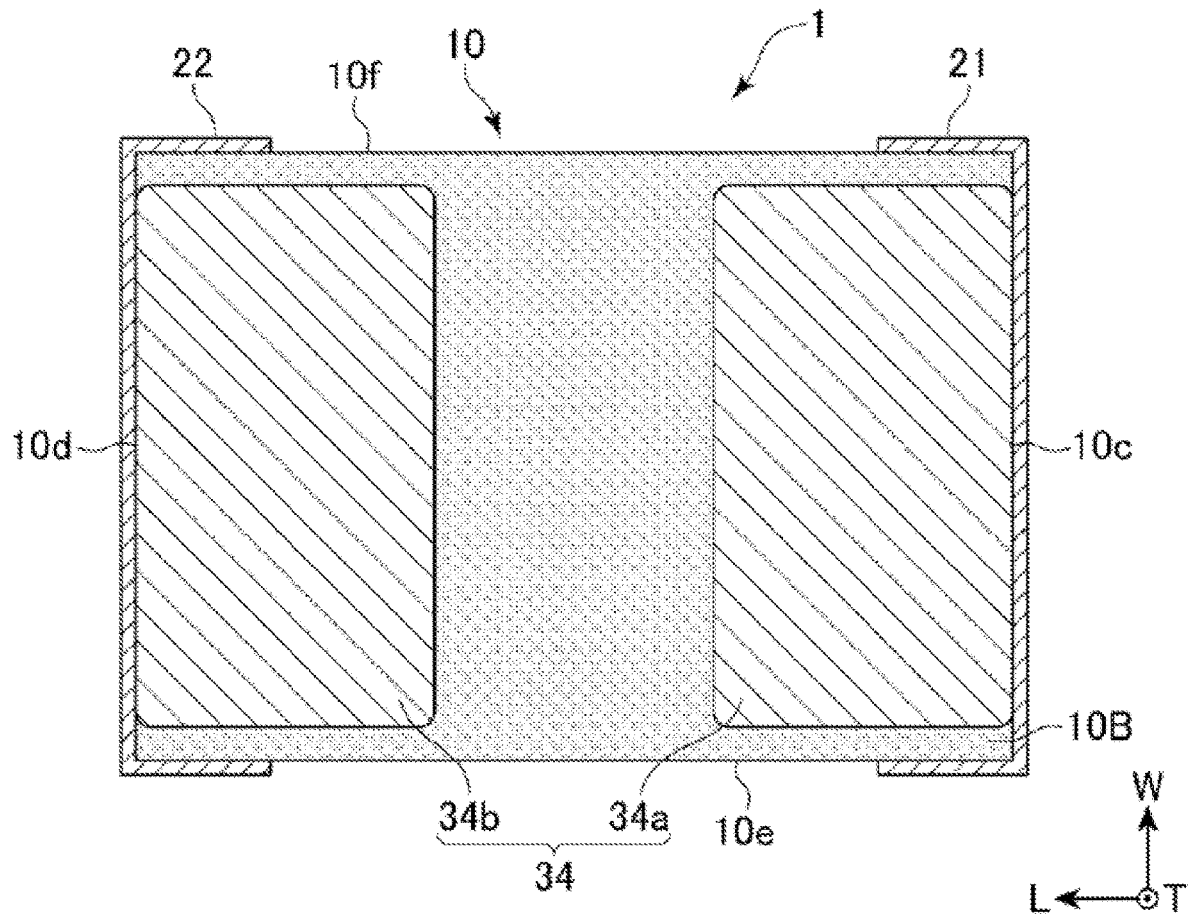
FIG. 8B is a transparent view of the coil component of FIG. 8A as viewed from above.

Next, a coil component 1 according to another embodiment of the present invention will be described with reference to FIGS. 8A and 8B. The coil component 1 shown in FIGS. 8A and 8B is different from the coil component 1 shown in FIGS. 7A and 7B in that the second region 10B is positioned to contact with the bottom surface of the reinforcement portion 34. The features common to the coil component 1 shown in FIGS. 8A and 8B and the coil component 1 shown in FIGS. 7A and 7B are not described here.

In the embodiment shown in FIG. 8A, the second region 10B extends from the bottom surface of the reinforcement portion 34 to the bottom surface 10b of the base body 10. In the embodiment shown, the reinforcement portion 34 is positioned at the border between the first region 10A and the second region 10B. In the embodiment shown, the reinforcement portion 34 is positioned to contact with both the first region 10A and the second region 10B. In producing the coil component 1 shown in FIGS. 8A and 8B, the heat treatment is performed on a chip laminate formed by stacking together the insulating sheets for forming the first region 10A and the insulating sheets for forming the second region 10B. Since the insulating sheets for forming the first region 10A and the insulating sheets for forming the second region 10B are made of different materials, these insulating sheets contract at different thermal contraction rates. On the other hand, the reinforcement portion 34 made of a metal material hardly contracts upon heating. Therefore, the reinforcement portion 34 can inhibit both the insulating sheets for forming the first region 10A and the insulating sheets for forming the second region 10B from contracting in the vicinity of the border between the first region 10A and the second region 10B. This prevents or inhibits delamination between the first region 10A and the second region 10B in the process of manufacturing the coil component 1.

Figure 9A:
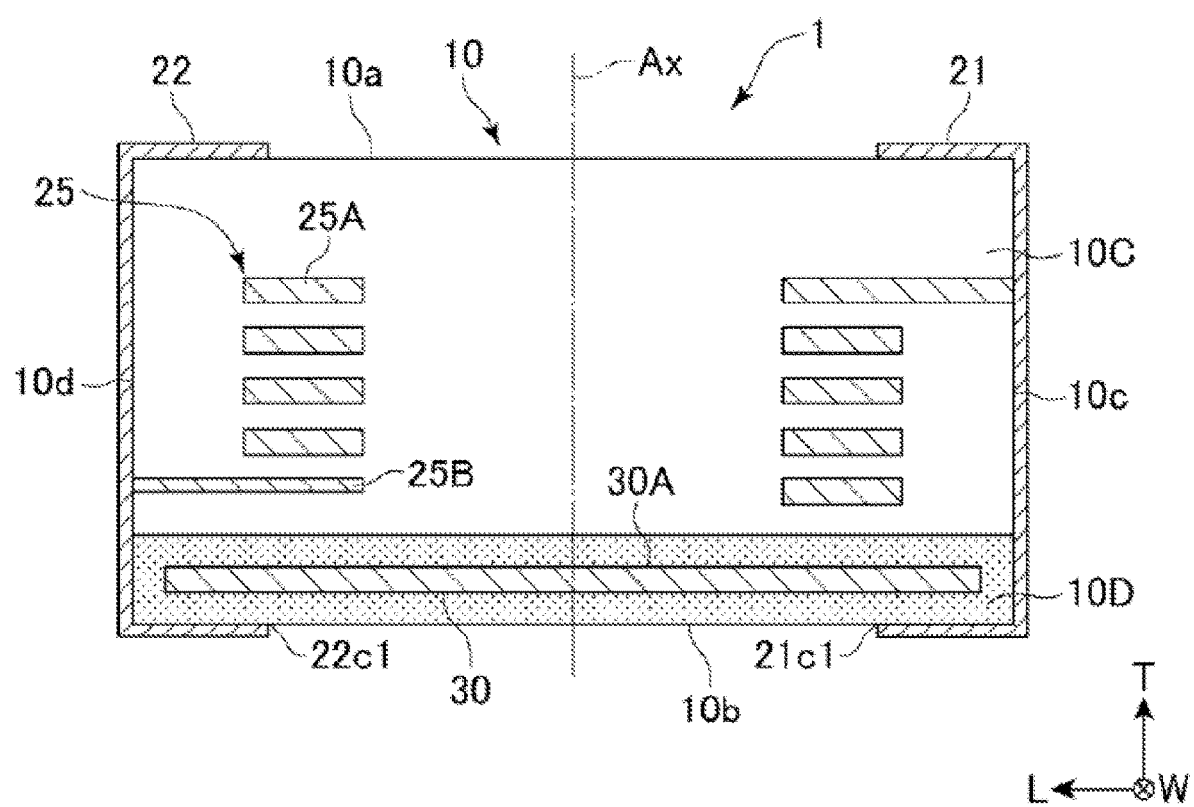
FIG. 9A schematically shows a longitudinal section of a coil component according to another embodiment of the present invention.
Figure 9B:
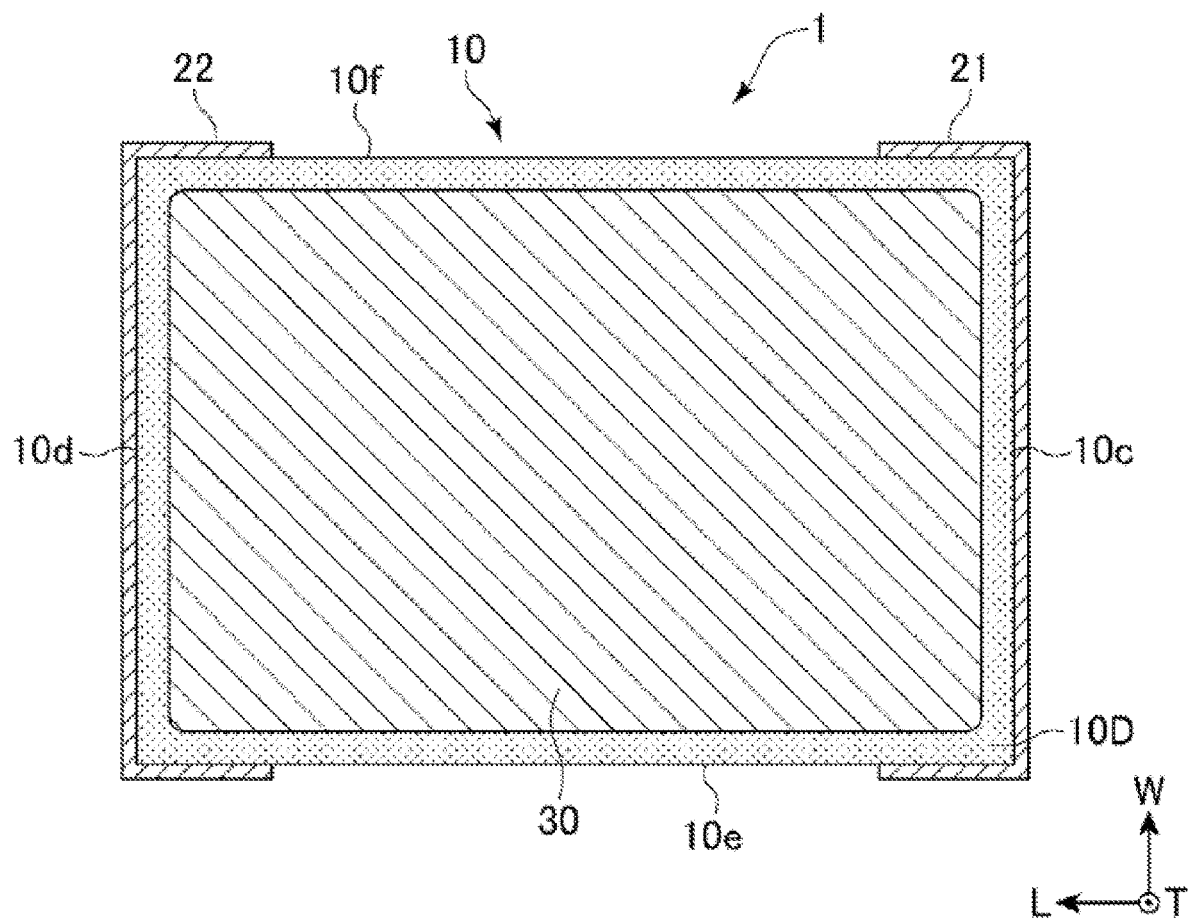
FIG. 9B is a transparent view of the coil component of FIG. 9A as viewed from above.

Next, a coil component 1 according to another embodiment of the present invention will be described with reference to FIGS. 9A and 9B. The coil component 1 shown in FIGS. 9A and 9B is different from the coil component 1 shown in FIGS. 2A and 2B in that the base body 10 is divided into the following regions: a third region 10C having a relatively low relative permittivity, and a fourth region 10D having a relatively high relative permittivity. The features common to the coil component 1 shown in FIGS. 9A and 9B and the coil component 1 shown in FIGS. 2A and 2B are not described here.

In one or more embodiments of the invention, the third region 10A covers the coil conductor 25. In one or more embodiments of the invention, the fourth region 10D covers the reinforcement portion 30. The fourth region 10D surrounding the reinforcement portion 30 has less influence on the electrical characteristics of the coil component 1 than the third region 10C, and therefore, the fourth region 10D may have a higher relative permittivity than the third region 10C. The fourth region 10D surrounding the reinforcement portion 30 has less influence on the electrical characteristics of the coil component 1 than the third region 10C, and therefore, the fourth region 10D may have a lower relative permeability than the third region 10C.

The position of the fourth region 10D is not limited to that shown. For example, it is possible that the fourth region 10D is disposed between the reinforcement portion 30 and the external electrode 21 or the external electrode 22 and is not disposed between the reinforcement portion 30 and the coil conductor 25.

The entirety of the base body 10 other then the fourth region 10D may be the third region 10C. The base body 10 may include a region other than the third region 10C and the fourth region 10D.

In one or more embodiments of the invention, the fourth region 10D has a higher relative permittivity than the third region 10C. In order to make the relative permittivity of the fourth region 10D higher than that of the third region 10C, the third region 10C and the fourth region 10D are formed of a nonmagnetic material containing, for example, silica ($SiO_2$) and alumina ($Al_2O_3$), and the content ratio of $SiO_2$ to $Al_2O_3$ in the fourth region 10D is made higher than that in the third region 10C.

In one or more embodiments of the invention, the fourth region 10D has a higher mechanical strength than the third region 10C. In order to make the mechanical strength of the fourth region 10D higher than that of the third region 10C, the fourth region 10D is formed of, for example, metal magnetic particles having a small average particle size, and the third region 10C is formed of, for example, metal magnetic particles having a large average particle size. The mechanical strength is represented by, for example, a bending strength.

Figure 10A:
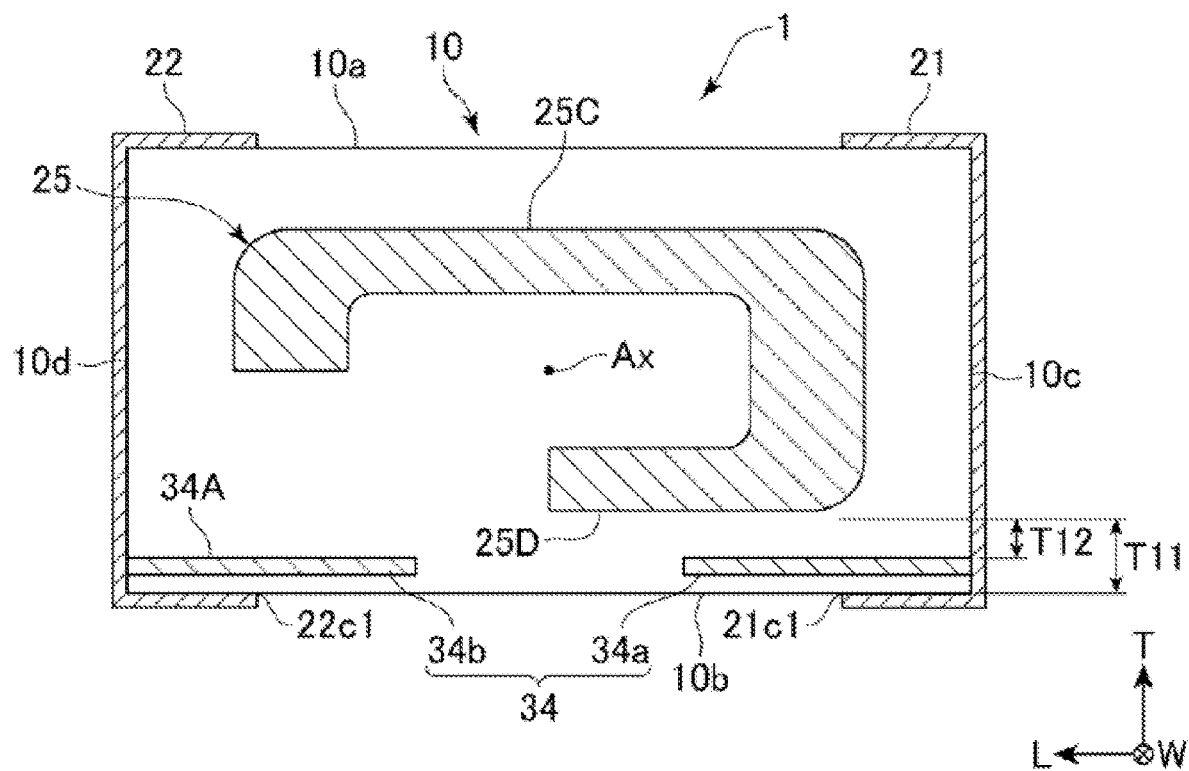
FIG. 10A schematically shows a longitudinal section of a coil component according to another embodiment of the present invention.
Figure 10B:
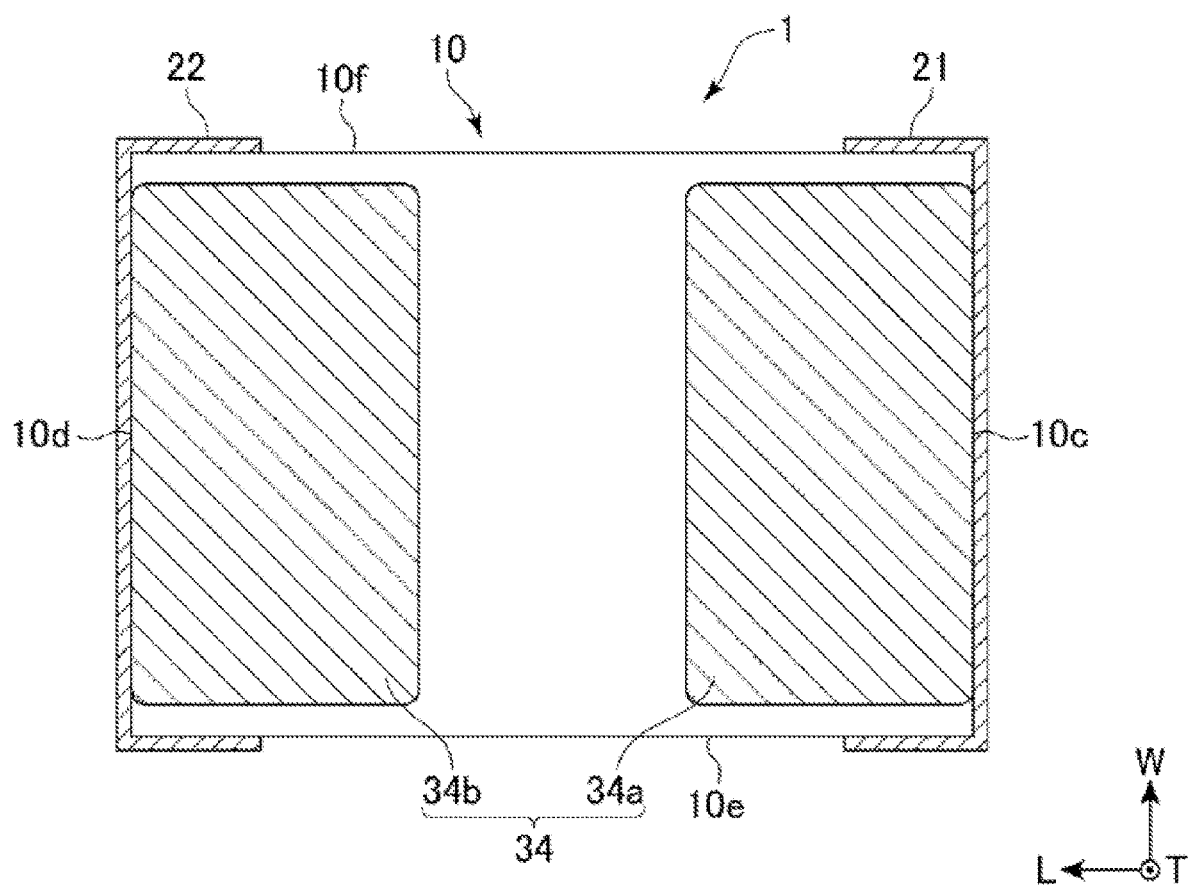
FIG. 10B is a transparent view of the coil component of FIG. 10A as viewed from above.

Next, a coil component 1 according to another embodiment of the present invention will be described with reference to FIGS. 10A and 10B. The coil component 1 shown in FIGS. 10A and 10B is different from the coil component 1 shown in FIGS. 6A and 6B in that the coil conductor 25 is replaced with a coil conductor 25. The features common to the coil component 1 shown in FIGS. 10A and 10B and the coil component 1 shown in FIGS. 6A and 6B are not described here.

The coil component 1 is what is called a horizontally mounted coil component. Specifically, as shown in FIGS. 10A and 10B, the coil conductor 25 is wound around the coil axis Ax extending in parallel with the bottom surface 10b of the base body 10. The top surface 25C of the coil conductor 25 faces the top surface 10a of the base body 10, and the bottom surface 25D of the coil conductor 25 faces the bottom surface 10b of the base body 10. The coil axis Ax may be positioned above the middle point between the top surface 10a and the bottom surface 10b of the base body 10 (on the positive side of the middle point in the T axis direction). The interval between the bottom surface 25D of the coil conductor 25 and the bottom surface 10b of the base body 10 may be larger than the interval between the top surface 25A of the coil conductor 25 and the top surface 10a of the base body 10. This reserves an installation space for the reinforcement portion 34 in the base body 10.

In one or more embodiments of the present invention, the reinforcement portion 34 is positioned closer to the bottom surface 10b of the base body 10 in the T axis direction than is the middle point between the bottom surface 25D of the coil conductor 25 and the bottom surface 10b of the base body 10. For example, the reinforcement portion 34 is positioned such that the top surface 34A thereof is positioned closer to the bottom surface 10b of the base body 10 than is the middle point between the bottom surface 25D of the coil conductor 25 and the bottom surface 10b of the base body 10. In the embodiment shown, the interval T12 between the bottom surface 25D of the coil conductor 25 and the top surface 30A of the reinforcement portion 34 is larger than a half of the interval T11 between the bottom surface 25D of the coil conductor 25 and the bottom surface 10b of the base body 10. The reinforcement portion 34 disposed in the base body 10 is electrically insulated from the coil conductor 25.

The coil component 1 shown in FIGS. 10A and 10B may also be manufactured by the sheet lamination method or other known processes. The coil component 1 shown in FIGS. 10A and 10B is produced by stacking together the insulating sheets in the W axis direction. The method of manufacturing the coil component 1 shown in FIGS. 10A and 10B may be substantially the same as the method of manufacturing the coil component 1 shown in FIGS. 2A and 2B except in the lamination direction of the insulating sheets.

Figure 11A:
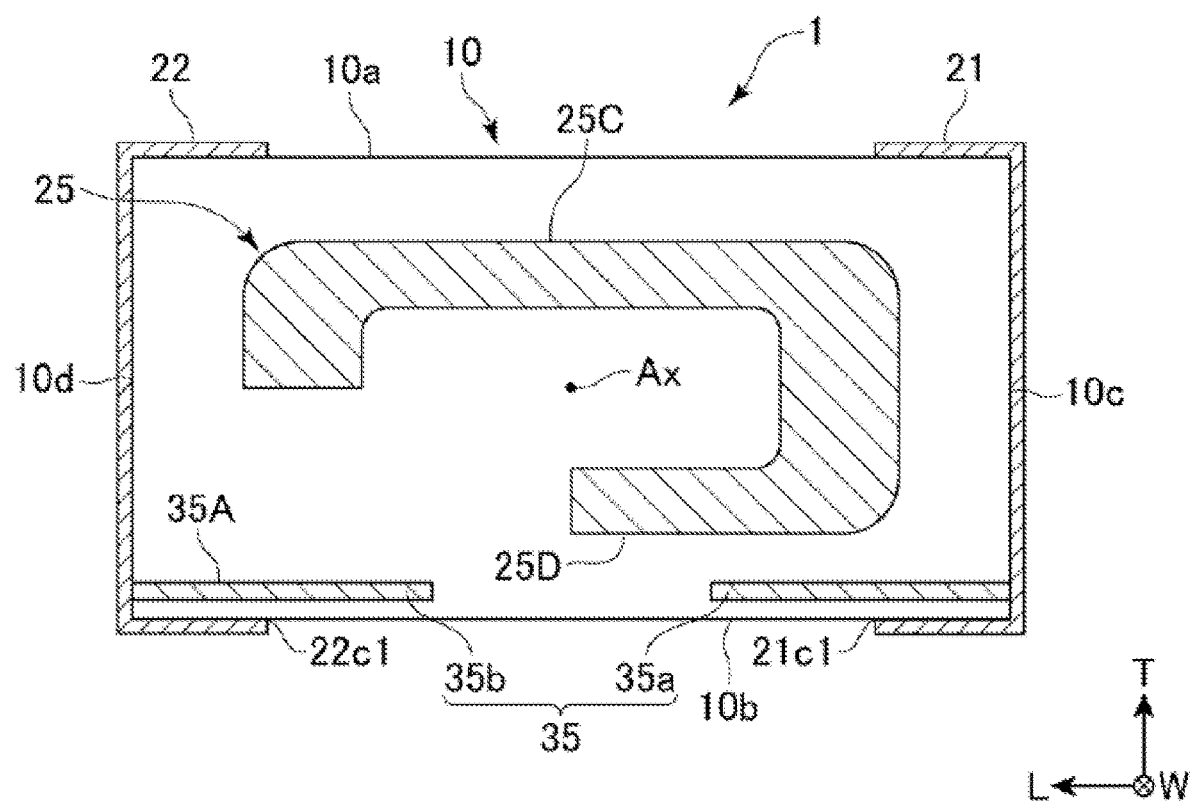
FIG. 11A schematically shows a longitudinal section of a coil component according to another embodiment of the present invention.
Figure 11B:
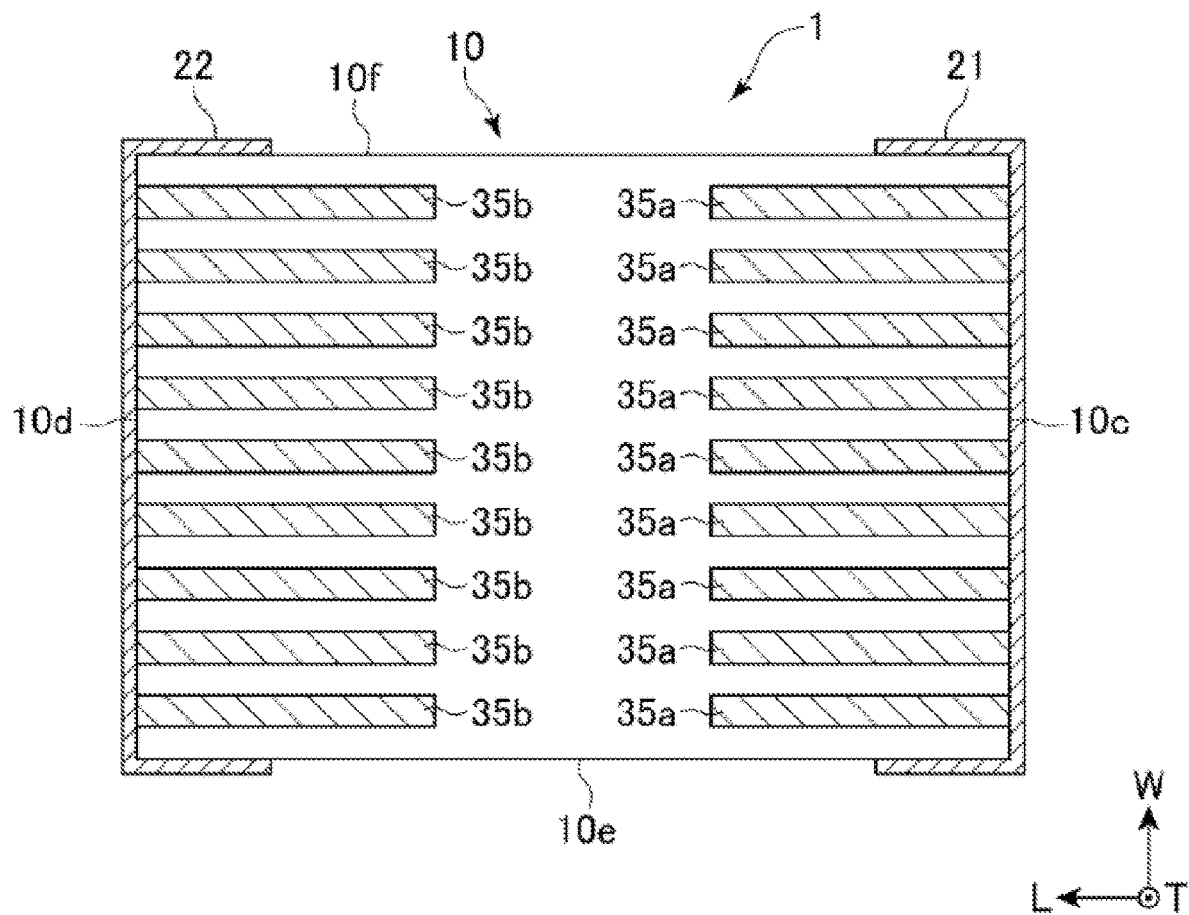
FIG. 11B is a transparent view of the coil component of FIG. 11A as viewed from above.

Next, a coil component 1 according to another embodiment of the present invention will be described with reference to FIGS. 11A and 11B. The coil component 1 shown in FIGS. 11A and 11B is different from the coil component 1 shown in FIGS. 10A and 10B in that the reinforcement portion 34 is replaced with a reinforcement portion 35. The features common to the coil component 1 shown in FIGS. 11A and 11B and the coil component 1 shown in FIGS. 10A and 10B are not described here.

The reinforcement portion 35 includes a plurality of first reinforcement members 35a and a plurality of second reinforcement members 35b. Each of the plurality of first reinforcement members 35a and the plurality of second reinforcement members 35b disposed in the base body 10 is positioned between the coil conductor 25 and the bottom surface 10b of the base body 10. In one or more embodiments, each of the plurality of first reinforcement members 35a and the plurality of second reinforcement members 35b has a thin plate-like shape and extends in parallel with the bottom surface 10b of the base body 10. Each of the plurality of first reinforcement members 35a is electrically insulated from other first reinforcement members 35a, and each of the plurality of second reinforcement members 35b is electrically insulated from other second reinforcement members 35b. Therefore, each of the plurality of first reinforcement members 35a is electrically insulated from each of the second reinforcement members 35b. In the embodiment shown, each of the plurality of first reinforcement members 35a is connected with the external electrode 21, and each of the plurality of second reinforcement members 35b is connected with the external electrode 22.

The coil component 1 shown in FIGS. 11A and 11B may also be manufactured by the sheet lamination method or other known processes. In this manufacturing process, conductor patterns for forming the first reinforcement members 35a and the second reinforcement members 35b after firing are formed on the insulating sheets by a known method such as screen printing. The conductor patterns for forming the first reinforcement members 35a and the second reinforcement members 35b may be either formed on the same insulating sheets as the conductor patterns for forming a part of the coil conductor 25 or formed on different insulating sheets.

Figure 12A:
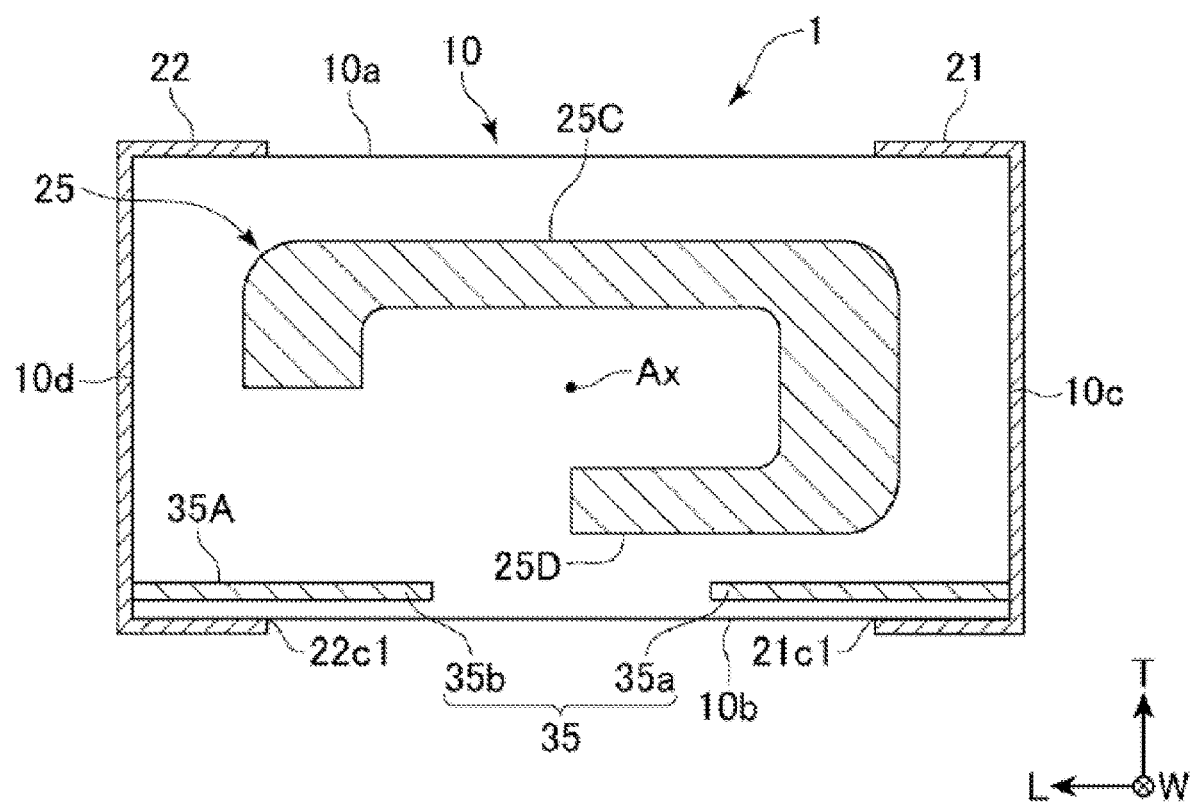
FIG. 12A schematically shows a longitudinal section of a coil component according to another embodiment of the present invention.
Figure 12B:
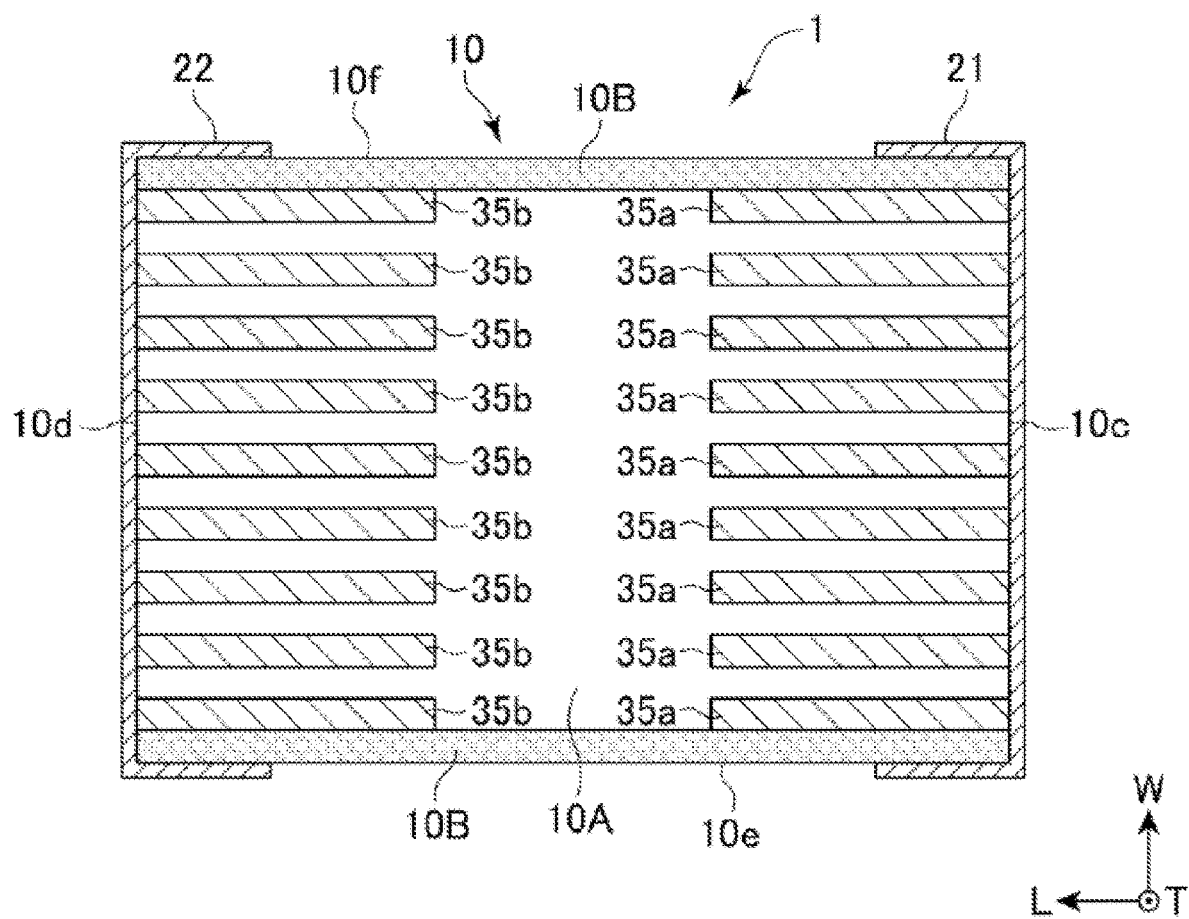
FIG. 12B is a transparent view of the coil component of FIG. 12A as viewed from above.

Next, a coil component 1 according to another embodiment of the present invention will be described with reference to FIGS. 12A and 12B. The coil component 1 shown in FIGS. 12A and 12B is different from the coil component 1 shown in FIGS. 11A and 11B in that the base body 10 is divided into the following regions: a first region 10A having a relatively low hardness, and a second region 10B having a relatively high hardness. The features common to the coil component 1 shown in FIGS. 12A and 12B and the coil component 1 shown in FIGS. 11A and 11B are not described here.

In one or more embodiments of the present invention, the second region 10B is disposed between the reinforcement portion 35 and the first side surface 10e of the base body 10 and between the reinforcement portion 35 and the second side surface 10f of the base body 10. In the embodiment shown, the second region 10B is positioned at the opposite ends of the base body 10 in the W axis direction. In other words, the second region 10B defines the first side surface 10e and the second side surface 10f of the base body 10.

In one or more embodiments of the invention, the second region 10B has a higher Vickers hardness than the first region 10A. In order to make the Vickers hardness of the second region 10B higher than that of the first region 10A, the first region 10A and the second region 10B are formed of a nonmagnetic material containing, for example, silica ($SiO_2$) and alumina ($Al_2O_3$), and the content ratio of $SiO_2$ to $Al_2O_3$ in the second region 10B is made higher than that in the first region 10A.

The second region 10B inhibits deformation of the base body 10 when a stress acts on the base body 10 in mounting the coil component 1 on the mounting substrate 2a. As a result, cracking in the base body 10 can be further inhibited.

The coil component 1 shown in FIGS. 12A and 12B may also be manufactured by the lamination process or other known processes, as with the coil component 1 shown in FIGS. 2A and 2B.

The present invention may encompass aspects realized by combining elements of the above embodiments, unless they create a contradiction. For example, the reinforcement portion 34 shown in FIGS. 8A and 8B may be replaced with any one of the reinforcement portions 30 and 32 to 35. In this case, the coil component 1 may include the reinforcement portion 30, 32, 33, 34, or 35 positioned so as to contact with both the bottom surface of the first region 10A and the top surface of the second region 10B. For another example, the reinforcement portion 30 shown in FIGS. 9A and 9B may be replaced with any one of the reinforcement portions 31 to 35. For still another example, the reinforcement portion 34 shown in FIGS. 10A and 10B may be replaced with any one of the reinforcement portions 30 to 33 and 35.

Advantageous effects of the above embodiments will be now described. In one or more embodiments of the present invention, the reinforcement portions 30 to 35 made of a metal material is positioned below the middle point between the bottom surface 10b of the base body 10 and the second coil surface 25B of the coil conductor 25, and therefore, less magnetic flux passes through the reinforcement portions 30 to 35. As a result, occurrence of eddy current in the reinforcement portions 30 to 35 can be inhibited. The reinforcement portions made of a metal material have conventionally been used mainly in capacitors. In capacitors, the reinforcement portions are positioned in the vicinity of the internal electrodes, because the reinforcement portions disposed outside the opposed internal electrode do not influence the characteristics of the capacitors (e.g., capacitance). For example, in the ceramic electronic component (a capacitor or an inductor) disclosed in Japanese Patent Application Publication No. 2012-044148, a reinforcement layer made of a metal material is positioned closer to an internal electrode than is the middle point between the bottom surface of the internal electrode and the bottom surface of the base body. In one or more embodiments of the present invention, the reinforcement portion is positioned below the middle point between the bottom surface 10b of the base body 10 and the second coil surface 25B of the coil conductor 25, unlike the position of the conventional reinforcement portion (reinforcement layer). As a result, occurrence of eddy current can be inhibited in the coil component including the reinforcement portion. Therefore, one or more embodiments of the present invention provide a coil component having a high mechanical strength and a reduced eddy current loss.

Electronic components used in vehicle-mounted electronic devices are mounted on a mounting substrate having a larger thickness for increasing the vibration resistance and the impact resistance, as compared to electronic components used in electronic devices not mounted on a vehicle (e.g., smartphone). With a larger thickness of the mounting substrate, the electronic component undergoes a larger strain when the mounting substrate is bent, and this may cause cracking in the base body of the electronic component. Therefore, coil components for vehicle-mounted devices are required to have an improved mechanical strength. In addition, coil components for vehicle-mounted devices are required to have a reduced eddy current loss, as are the general coil components. One or more embodiments of the present invention provide a coil component suited for in-vehicle applications, with a high mechanical strength and a reduced eddy current loss.

In mounting the coil component 1 on the mounting substrate 2a, the base body 10 receives a large stress at the bottom surface 10b from the distal end 21c1 of the external electrode 21 and the distal end 22c1 of the external electrode 22. Therefore, the base body 10 is prone to cracking near the distal end 21c1 of the external electrode 21 and the distal end 22c1 of the external electrode 22. In one or more embodiments of the present invention, the reinforcement portions 30 to 35 overlap, in the top view, with at least a part of the distal end 21c1 of the first bottom portion 21c of the external electrode 21 and at least a part of the distal end 22c1 of the second bottom portion 22c of the external electrode 22, and therefore, the reinforcement portions 30 to 35 reinforce the portion of the base body 10 where the stress concentrates. Further, the reinforcement portions 30 to 35 can prevent expansion of cracking that has occurred in the base body 10. For example, even when cracking occurs in the base body 10 near the distal end 21c1 of the external electrode 21 and the distal end 22c1 of the external electrode 22, the reinforcement portions 30 to 35 prevent the cracking from expanding into the region above the reinforcement portions 30 to 35 where the coil conductor 25 is disposed.

In one or more embodiments of the present invention, the reinforcement portions 30 to 35 may be connected with at least one of the external electrode 21 and the external electrode 22. The reinforcement portions 30 to 35 may be connected with the external electrode 21 and the external electrode 22 such that the reinforcement portions 30 to 35 cause no short circuit between the external electrode 21 and the external electrode 22. When the reinforcement portions 30 to 35 are connected with the external electrode 21, the stress acting from the external electrode 21 to the base body 10 in mounting the coil component 1 can be allowed to act directly on the reinforcement portions 30 to 35, and therefore, the stress can be allowed to act on the reinforcement portions 30 to 35 distributively at the portions connected with the external electrode 21 and at the portions corresponding to the distal end 21c1 of the external electrode 21. Likewise, when the reinforcement portions 30 to 35 are connected with the external electrode 22, the stress acting from the external electrode 22 to the base body 10 in mounting the coil component 1 can be allowed to act directly on the reinforcement portions 30 to 35, and therefore, the stress can be allowed to act on the reinforcement portions 30 to 35 distributively at the portions connected with the external electrode 22 and at the portions corresponding to the distal end 22c1 of the external electrode 22. In this way, since the stress acting on the base body 10 in mounting the coil component is distributed, cracking in the base body 10 can be further inhibited.

In one or more embodiments of the present invention, the reinforcement portion 30 to 35 are made of a nonmagnetic metal material, and therefore, it is possible to further inhibit occurrence of the eddy current in the reinforcement portions 30 to 35.

In one or more embodiments of the present invention, the reinforcement portion 31 includes the first reinforcement member 31*a* and the second reinforcement member 31*b*, and the first reinforcement member 31*a* and the second reinforcement member 31*b* are separated by a part of the insulating base body 10. Therefore, it is possible to further inhibit the occurrence of the eddy current as compared to the case where a reinforcement portion having roughly the same volume as the reinforcement member 31 is formed of a single member. The same advantageous effect can also be produced in the embodiments including the reinforcement portions 32 to 34.

In one or more embodiments of the present invention, the base body 10 includes the second region 10B having a high hardness between the bottom surface 10*b* and the reinforcement portions 30 to 35. The second region 10B inhibits deformation of the base body 10 when a stress acts from the external electrode 22 to the base body 10 in mounting the coil component 1. As a result, cracking in the base body 10 can be further inhibited.

In one or more embodiments of the present invention, the external electrode 21 and the external electrode 22 are in contact with the second region 10B having a higher Vickers hardness than the other region in the base body 10. This inhibits a dent from occurring in the bottom surface 10*b* of the base body 10 at the portions contacting with the external electrode 21 and the external electrode 22 when a stress acts from the external electrode 22 to the base body 10 in mounting the coil component 1. A dent occurring in the bottom surface 10*b* (or any other surface) of the base body 10 may cause cracking from the position of the dent since a stress concentrates at the dent. In one or more embodiments of the present invention, the external electrode 21 and the external electrode 22 are in contact with the second region 10B having a higher hardness than the other region in the base body 10. This inhibits a dent from occurring in the bottom surface 10*b* of the base body 10 in mounting the coil component 1. As a result, cracking in the base body 10 can be inhibited.

In one or more embodiments of the present invention, the reinforcement portions 30 to 35 are in contact with both the first region 10A and the second region 10B. In the manufacturing process of the coil component 1, heating the insulating sheets produces a contraction stress in the insulating sheets. Since the reinforcement portions 30 to 35 made of a metal material hardly contract upon heating, the reinforcement portions 30 to 35 can inhibit contraction of both the first region 10A and the second region 10B. This prevents or inhibits delamination between the first region 10A and the second region 10B due to the difference in thermal contraction rate when the base body 10 is heated.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

What is claimed is:

1. A coil component comprising:
    an insulating base body having a top surface and a bottom surface;
    a single coil conductor disposed in the base body, the single coil conductor having a first coil surface opposed to the top surface and a second coil surface opposed to the bottom surface;
    a reinforcement portion made of a metal material and disposed in the base body at a position closer to the bottom surface than is a middle point between the bottom surface and the second coil surface;
    a first external electrode electrically connected with one end of the single coil conductor and having a first bottom portion contacting at least with the bottom surface of the base body; and
    a second external electrode electrically connected with the other end of the single coil conductor and having a second bottom portion contacting at least with the bottom surface of the base body,
    wherein an interval between the second coil surface of the single coil conductor and the bottom surface is larger than an interval between the first coil surface of the single coil conductor and the top surface,
    wherein the base body includes a first region and a second region, the first region covers the single coil conductor, and the second region is disposed between the reinforcement portion and the bottom surface and has a higher Vickers hardness than the first region, wherein the reinforcement portion extends parallel to the bottom surface, wherein the second region extends parallel to the bottom surface, and wherein the reinforcement portion and the second region are arranged in an axis direction extending perpendicular to the bottom surface, and
    wherein the first bottom portion of the first external electrode and the second bottom portion of the second external electrode are in contact with the second region; wherein the second region contains nonmagnetic materials, the nonmagnetic materials including silica and alumina.

2. The coil component of claim 1,
    wherein the first external electrode and the second external electrode are positioned such that a distal end of the first bottom portion is opposed to a distal end of the second bottom portion of the second external electrode, and
    wherein the reinforcement portion is positioned to overlap, in a top view, with at least a part of the distal end of the first bottom portion and at least a part of the distal end of the second bottom portion.

3. The coil component of claim 2,
    wherein the distal end of the first bottom portion and the distal end of the second bottom portion extend in an axial direction, and
    wherein the reinforcement portion overlaps, in the top view, with 50% or more of each of the distal end of the first bottom portion and the distal end of the second bottom portion in the axial direction.

4. The coil component of claim 3, wherein the reinforcement portion is disposed in the base body so as not to be exposed out of the base body in the axial direction.

5. The coil component of claim 1, wherein the reinforcement portion is connected with at least one of the first external electrode and the second external electrode.

6. The coil component of claim 1, wherein the reinforcement portion is made of a nonmagnetic metal material.

7. The coil component of claim 1, wherein the reinforcement portion includes a first reinforcement member and a second reinforcement member spaced apart from the first reinforcement member.

8. The coil component of claim 7,
wherein the first external electrode and the second external electrode are positioned such that a distal end of the first bottom portion is opposed to a distal end of the second bottom portion of the second external electrode, and
wherein the first reinforcement member overlaps with at least a part of the distal end of the first bottom portion, and
wherein the second reinforcement member overlaps with at least a part of the distal end of the second bottom portion.

9. The coil component of claim 7, wherein the second reinforcement member is positioned closer to the bottom surface than is the first reinforcement member.

10. The coil component of claim 7, wherein the first reinforcement member is connected with the first external electrode.

11. The coil component of claim 7, wherein the second reinforcement member is connected with the second external electrode.

12. The coil component of claim 1, wherein the reinforcement portion is in contact with a top surface of the second region.

13. The coil component of claim 1, wherein the base body includes a third region and a fourth region, the third region covers the single coil conductor, and the fourth region is disposed at least between the reinforcement portion and the first external electrode or between the reinforcement portion and the second external electrode and has a higher permittivity than the third region.

14. The coil component of claim 13, wherein the fourth region is additionally disposed between the reinforcement portion and the single coil conductor.

15. The coil component of claim 1, wherein the single coil conductor includes a winding portion wound around a coil axis extending in a direction perpendicular to the bottom surface of the base body.

16. The coil component of claim 1, wherein the single coil conductor includes a winding portion wound around a coil axis extending in a direction parallel to the bottom surface of the base body.

17. A circuit board comprising the coil component of claim 1.

18. An electronic device comprising the circuit board of claim 17.

19. The coil component according to claim 1,
wherein the base body includes metal magnetic particles, and
wherein the reinforcement portion is not disposed between the first coil surface of the single coil conductor and the top surface.

* * * * *